(12) United States Patent
Shirahata

(10) Patent No.: US 11,003,990 B2
(45) Date of Patent: May 11, 2021

(54) CONTROLLING MEMORY AREA FOR TRAINING A NEURAL NETWORK

(71) Applicant: FUJITSU LIMITED, Kawasaki (JP)

(72) Inventor: Koichi Shirahata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 892 days.

(21) Appl. No.: 15/722,270

(22) Filed: Oct. 2, 2017

(65) Prior Publication Data

US 2018/0150745 A1    May 31, 2018

(30) Foreign Application Priority Data

Nov. 25, 2016    (JP) .............................. JP2016-229386

(51) Int. Cl.
  *G06N 3/04*    (2006.01)
  *G06N 3/08*    (2006.01)
  *G06K 9/62*    (2006.01)

(52) U.S. Cl.
  CPC ................. *G06N 3/08* (2013.01); *G06K 9/62* (2013.01); *G06N 3/0454* (2013.01); *G06N 3/084* (2013.01)

(58) Field of Classification Search
  CPC ......... G06N 3/0454; G06N 3/08; G06N 3/084
  See application file for complete search history.

(56) References Cited

U.S. PATENT DOCUMENTS

| 2010/0223219 | A1 | 9/2010 | Kato et al. |
| 2018/0088996 | A1* | 3/2018 | Rossi ................... G06F 9/5016 |
| 2018/0113649 | A1* | 4/2018 | Shafiee Ardestani ...................... G06F 3/0659 |
| 2019/0188572 | A1* | 6/2019 | Lanctot ................. G06N 3/084 |

FOREIGN PATENT DOCUMENTS

JP    2008-310700    12/2008

OTHER PUBLICATIONS

Chen, Tianqi, et al. "Training deep nets with sublinear memory cost." arXiv preprint arXiv: 1604.06174 (2016). (Year: 2016).*
Notice of Reasons for Refusal, dated Oct. 6, 2020, in corresponding Japanese Application No. 2016229386 (8 pp.).
Koichi Shirahata, et al., "Memory reduction method for deep neural network training", 2016 IEEE 26th Workshop on Machine Learning for Signal Processing (MLSP) (7 pp.).

* cited by examiner

*Primary Examiner* — Hal Schnee
(74) *Attorney, Agent, or Firm* — Staas & Halsey LLP

(57) ABSTRACT

An information processing device includes: a processor that executes a process, the process including: controlling a recognition process that performs, with respect to input neuron data, a hierarchical neural network operation including a weighting operation using a parameter and that holds the neuron data and the parameter of each layer of the neural network in each of memory areas; and performing, in a learning process of learning the parameter of each layer of the neural network from an error that is obtained from a recognition result, regarding the layer in which the neuron data and the parameter are held in the memory areas, control of calculating an error of the neuron data after calculating an error of the parameter.

5 Claims, 18 Drawing Sheets

FIG.5

| Layer | NEURON DATA (AT TIME OF RECOGNITION) | PARAMETER (AT TIME OF RECOGNITION) | NEURON DATA (AT TIME OF LEARNING) | PARAMETER (AT TIME OF LEARNING) |
|---|---|---|---|---|
| Input | 64x1x28x28=50,176 | 0 | 64x1x28x28=50,176 | 0 |
| Convolution1 | 64x20x24x24=737,280 | 1x20x5x5=500 | 64x20x24x24=737,280 | 1x20x5x5=500 |
| Pooling1 | 64x20x12x12=184,320 | 0 | 64x20x12x12=184,320 | 0 |
| Convolution2 | 64x50x8x8=204,800 | 20x50x5x5=25,000 | 64x50x8x8=204,800 | 20x50x5x5=25,000 |
| Pooling2 | 64x50x4x4=51,200 | 0 | 64x50x4x4=51,200 | 0 |
| Fully-connected1 | 64x500=32,000 | (50x4x4)x500=400,000 | 64x500=32,000 | (50x4x4)x500=400,000 |
| Fully-connected2 | 64x10=640 | 500x10=5,000 | 64x10=640 | 500x10=5,000 |
| Softmax | 64x10=640 | 0 | 64x10=640 | 0 |
| Total | 1.26Mx4bytes=5.04MB | 431Kx4bytes=1.72MB | 1.26Mx4bytes=5.04MB | 431Kx4bytes=1.72MB |

FIG.12

| Layer | NEURON DATA (AT TIME OF RECOGNITION) | PARAMETER (AT TIME OF RECOGNITION) | NEURON DATA (AT TIME OF LEARNING) | PARAMETER (AT TIME OF LEARNING) | ERROR OF PREVIOUS CYCLE |
|---|---|---|---|---|---|
| Input | 50176 | 0 | 50176 | 0 | 0 |
| Conv1 | 737280 | 500 | 737280 | 500 | 500 |
| Pool1 | 184320 | 0 | 184320 | 0 | 0 |
| Conv2 | 204800 | 25000 | 204800 | 25000 | 25000 |
| Pool2 | 51200 | 0 | 51200 | 0 | 0 |
| Fully-connected1 | 32000 | 400000 | 32000 | 400000 | 400000 |
| Fully-connected2 | 640 | 5000 | 640 | 5000 | 5000 |
| Softmax | 640 | 0 | 640 | 0 | 0 |
| Total | 1261056 | 430500 | 1261056 | 430500 | 430500 |
| TOTAL IN BATCH SIZE | =5044224 | =1722000 | =5044224 | =1722000 | =1722000 |
| SUM TOTAL | 5044224+1722000 +5044224+1722000 +1722000 =15254448 | | | | |

FIG.15

| Layer | NEURON DATA (AT TIME OF RECOGNITION) | PARAMETER (AT TIME OF RECOGNITION) | NEURON DATA (AT TIME OF LEARNING) | PARAMETER (AT TIME OF LEARNING) | ERROR OF PREVIOUS CYCLE |
|---|---|---|---|---|---|
| Input | 50176 | 0 | 0 | 0 | 0 |
| Conv1 | 737280 | 500 | 0 | 0 | 500 |
| Pool1 | 184320 | 0 | 0 | 0 | 0 |
| Conv2 | 204800 | 25000 | 0 | 0 | 25000 |
| Pool2 | 51200 | 0 | 0 | 0 | 0 |
| Fully-connected1 | 32000 | 400000 | 0 | 400000 | 400000 |
| Fully-connected2 | 640 | 5000 | 0 | 0 | 5000 |
| Softmax | 640 | 0 | 0 | 0 | 0 |
| Total | 1261056 | 430500 | 0 | 400000 | 430500 |
| TOTAL IN BATCH SIZE | =5044224 | =1722000 | =0 | =1600000 | =1722000 |
| SUM TOTAL | 5044224+1722000 +0+1722000 +1600000 =10088224 | | | | |

CONTROLLING MEMORY AREA FOR TRAINING A NEURAL NETWORK

CROSS-REFERENCE TO RELATED APPLICATION

This application is based upon and claims the benefit of priority of the prior Japanese Patent Application No. 2016-229386, filed on Nov. 25, 2016, the entire contents of which are incorporated herein by reference.

FIELD

The embodiments discussed herein are related to an information processing device, an information processing system and a computer-readable recording medium.

BACKGROUND

In recent years, machine learning using neural networks having multilayer structure has been drawing attention. The machine learning using such neural networks having multilayer structure is also called deep learning. Multi layering of neural networks is improved in deep learning and effectiveness is confirmed in various fields. For example, in recognition of images/voices, deep learning exhibits high recognition accuracy equal to that performed by a human.

Patent Document 1: Japanese Laid-open Patent Publication No. 2008-310700

Deep learning automatically learns the features in a neural network by performing supervised learning. However, in deep learning, with multilayer structure of the neural network, the amount of memory used is increased and the amount of memory used is further increased at the time of learning. For example, in an error back propagation method typically used in supervised learning, recognition is performed by sequentially propagating pieces of data used for the learning to a neural network and an error is obtained by comparing the recognition result with a correct answer. Then, in the error back propagation method, the error between the recognition result and the correct answer is allowed to be propagated to the neural network in a direction opposite to that at the time of recognition and then the parameter of each of the layers of the neural network is changed. Consequently, at the time of learning, the amount of memory used is increased. For example, because a gradient of an error is stored for the learning, the amount of data is increased more than double compared with a case where only recognition is performed and, in some cases, the amount of memory used is increased more than double.

SUMMARY

According to an aspect of an embodiment, an information processing device includes: a processor that executes a process, the process including: controlling a recognition process that performs, with respect to input neuron data, a hierarchical neural network operation including a weighting operation using a parameter and that holds the neuron data and the parameter of each layer of the neural network in each of memory areas; and performing, in a learning process of learning the parameter of each layer of the neural network from an error that is obtained from a recognition result, regarding the layer in which the neuron data and the parameter are held in the memory areas, control of calculating an error of the neuron data after calculating an error of the parameter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of an amount of conventional memory used;

FIG. 12 is a diagram illustrating an example of an amount of conventional memory used;

FIG. 15 is a diagram illustrating an example of the amount of memory used in a neural network performed by using the momentum method that uses the second embodiment;

DESCRIPTION OF EMBODIMENTS

Preferred embodiments of the present invention will be explained with reference to accompanying drawings. Furthermore, the disclosed technology is not limited to the embodiments. Furthermore, the embodiments described below may also be appropriately used in combination as long as processes do not conflict with each other.

[a] First Embodiment

Explanation of Conventional Deep Learning

Figure 1:
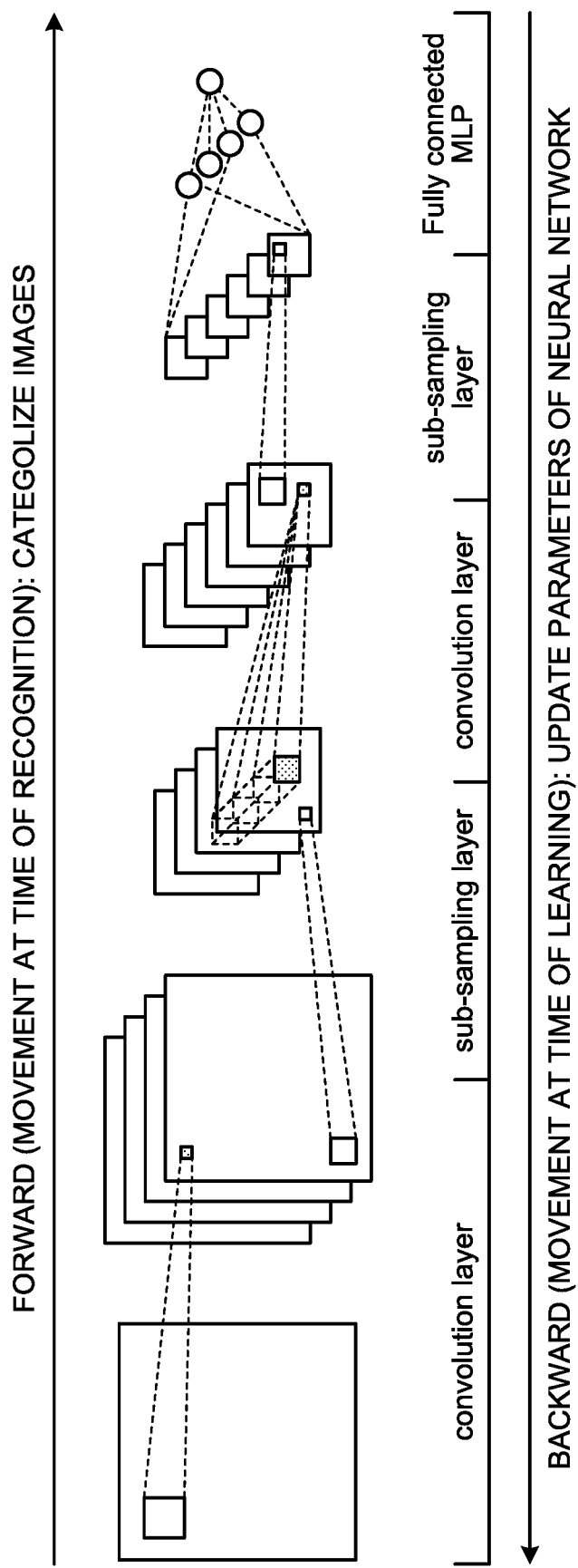
FIG. 1 is a schematic diagram illustrating an example of the flow of a process of deep learning.

First, conventional deep learning will be described. FIG. 1 is a schematic diagram illustrating an example of the flow of a process of deep learning. Deep learning automatically learns the features of the identification target in a neural network by performing supervised learning related to the identification target. In deep learning, the identification target is identified by using a neural network that learned features. For example, deep learning automatically learns the features of the identification target captured on an image by performing supervised learning by using a lot of images in which the identification target is captured as images used for the learning. In deep learning, by using a neural network that learned features in this way, the identification target captured on the image can be recognized. A lot of neurons (nerve cells) are present in a brain. Each of the neurons receives a signal from another neuron and transfers the signal to the other neuron. The brain performs various kinds of information processing based on the flow of this signal. A neural network is a model that realizes the characteristics of the brain on a computer. The neural network hierarchically connects units formed by imitating neurons in a brain. The units are also referred to as nodes. Each unit receives data from another unit and transfers the data to the other unit. A neural network can identify (recognize) various kinds of identification targets by changing a parameter of a unit based on the learning and by changing the data that is transferred. Hereinafter, the data transmitted in a neural network is referred to as neuron data. FIG. 1 illustrates, as an example of a neural network, an example of a convolutional neural network (CNN) used to recognize images. In the following, a description will be given of a case in which image recognition is performed by a convolutional neural network as a neural network. The neural network has a hierarchical structure and includes convolution layers, pooling (sub-sampling) layers, and fully-connected layers. In the example illustrated in FIG. 1, the convolution layer and the pooling layer are arranged twice alternately; however, more layers may also be arranged. Furthermore, a plurality number of fully connected layers may also be arranged. The hierarchical structure of the neural network and the configuration of each of the layers are previously set by a designer in accordance with the target for the recognition.

In a neural network, when performing image recognition, as illustrated in FIG. 1, by alternately repeating the convolution layers and the pooling layers multiple times from the left to the right, the features of the identification target captured on the image are extracted and then identification target captured on the image is finally identified (categorized) in the fully connected layer. In contrast, in the neural network, when performing image learning, as illustrated in FIG. 1, an error between the identified result and the correct answer is obtained; the obtained error is allowed to be backwardly propagated to the neural network from the right to the left; and the parameter of each of the layers of the convolutional neural network is changed.

Figure 2A:
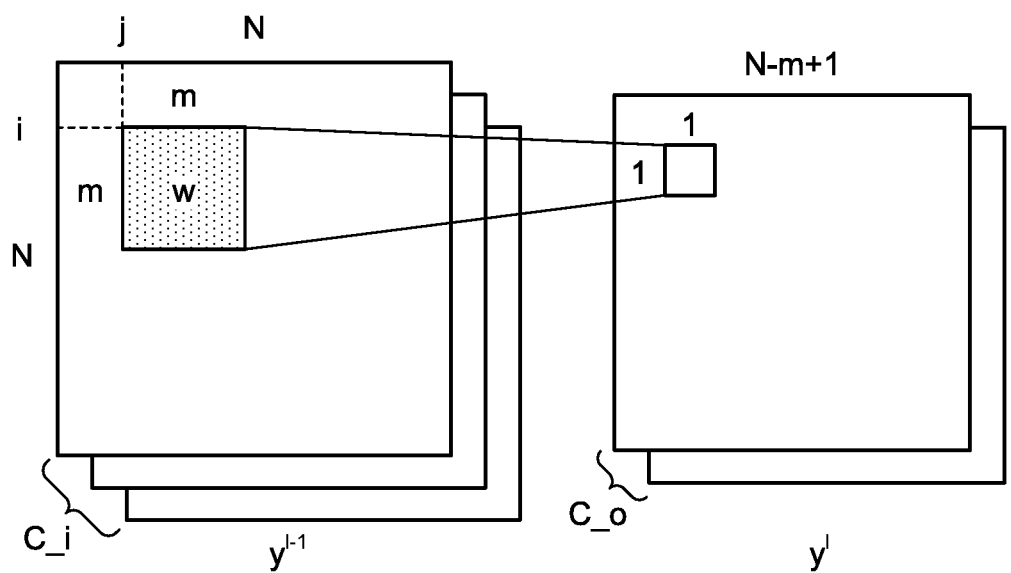
FIG. 2A is a schematic diagram illustrating an example of a convolution operation.

In the following, the operation of each of the layers will be described. In the convolution layer, a convolution operation of the input neuron data is performed. FIG. 2A is a schematic diagram illustrating an example of the convolution operation. The example illustrated in FIG. 2A indicates a case in which the convolution operation is performed on the input image of N×N pixels. In the convolution layer, by using the value of each of the pixels of the image of N×N pixels as corresponding pieces of neuron data and by calculating convolution of filters each having the size of m×m in which the parameter is set, a neuron data used to output to the subsequent layer is created. Furthermore, in the convolution layer, by allowing the output purpose neuron data to pass the nonlinear activation function σ, firing (activation) is modeled. The firing mentioned here is a phenomenon in which the signal that is output when the value of the signal to be output from the neuron exceeds a certain value is transferred to another neuron.

For example, in the convolution layer, the convolution operation indicated by Equation (1) below is performed and the operation of the nonlinear activation function σ indicated by Equation (2) below is performed on the operation result.

$$x_{ij}^l = \sum_{a=0}^{m-1}\sum_{b=0}^{m-1} w_{ab} y_{(i+a)(j+b)}^{l-1} \quad (1)$$

$$y_{ij}^l = \sigma(x_{ij}^l) + b^l \quad (2)$$

where, $y^{l-1}_{(i+a)(j+b)}$ is the neuron data corresponding to an input and is data of (i+a,j+b) pixels included in an image $y^{l-1}$ of N×N pixels illustrated in FIG. 2A; $w_{ab}$ is each parameter representing the weight of a filter w with the size of m×m illustrated in FIG. 2A; $x^l_{ij}$ is data of (i,j) pixels subjected to a convolution operation; and $y^l_{ij}$ is neuron data that becomes an output of the unit $U^l_i$ as the result of applying a nonlinear activation function σ to $x^l_{ij}$ and adding a predetermined bias $b^l$ and that also becomes an input to the subsequent layer.

Figure 2B:
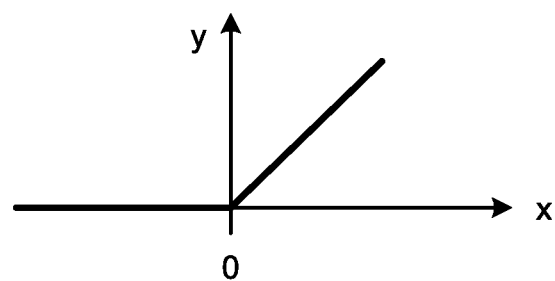
FIG. 2B is a schematic diagram illustrating an example of a ReLU.

As the nonlinear activation function σ, for example, a ramp function (ReLU) may also be used. FIG. 2B is a schematic diagram illustrating an example of the ReLU. In the example illustrated in FIG. 2B, if an input X is less than zero, zero is output to an output Y. Furthermore, if the input X exceeds zero, a value of the input X is output to the output Y.

Figure 2C:
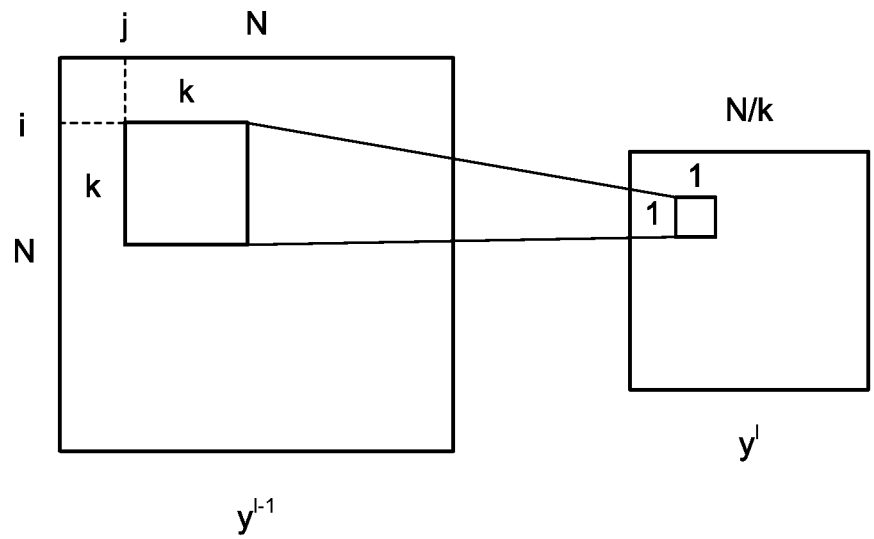
FIG. 2C is a schematic diagram illustrating an example of thinning out.

In the pooling layer, thinning out of input neuron data is performed. FIG. 2C is a schematic diagram illustrating an example of the thinning out. For example, the image of N×N pixels is input as the neuron data. In the pooling layer, the neuron data of N×N pixels are thinned out to the neuron data of N/k×N/k. For example, for each area of k×k, the thinning out is performed by using Max-Pooling that extracts the maximum value. Any method may also be used for the thinning out. For example, the thinning out may also be performed by using Average-Pooling that extracts the average value of the area of k×k. Furthermore, in the pooling layer, a part of the area of k×k in which the thinning out is performed may also be overlapped or the thinning out may also be performed by neighboring each other without being overlapped.

For example, in the pooling layer, the Max-Pooling indicated by Equation (3) is performed.

$$y^l_{i,j} = \max(\{y^{l-1}_{i+a,j+b} | a,b \in [0,k-1]\}) \quad (3)$$

where, the function max is a function that outputs neuron data with the maximum value in each area of k pixels from (i,j) pixels illustrated in FIG. 2C; and $y^l_{i,j}$ is the neuron data that becomes an output of the unit $U^l i$.

In the fully connected layer, a fully-connected operation in which full connection is performed on the input neuron data in accordance with the number of targets for the recognition. For example, the image of N×N pixels is input as the neuron data. In the fully connected layer, by multiplying all of the pieces of the neuron data of N×N pixels by each of the weights (parameters), the neuron data used to output to the next layer is created. Furthermore, by performing the operation that allows the an output purpose neuron data to pass the nonlinear activation function σ, the fully connected layer models firing.

Figure 2D:
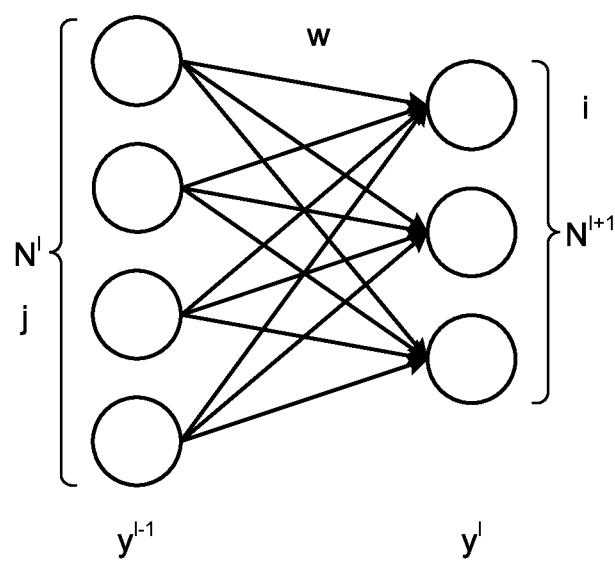
FIG. 2D is a schematic diagram illustrating an example of full connection.

FIG. 2D is a schematic diagram illustrating an example of full connection. The example illustrated in FIG. 2D indicates an example of a case in which, if the number of targets for the recognition is i, i pieces of neuron data are obtained by fully connecting each of j pieces of neuron data. For example, in the fully connected layer, the fully-connected operation represented by Equation (4) below is performed and the operation of Equation (5) below is performed on the operation result.

$$x_i^l = \sum_j w_{ji}^{l-1} y_j^{l-1} \tag{4}$$

$$y_i^l = \sigma(x_i^l) + b_i^l \tag{5}$$

where, $y^{l-1}_j$ is an output of the unit $U^{l-1}$ and is neuron data that becomes an input of unit $U^l$; $w^{l-1}_{ji}$ is a parameter representing the weight associated with $y^{l-1}_j$ and $y^l_i$; $x^l_i$ is data subjected to a weighting operation; and $y^l_i$ is neuron data that becomes an output of the unit $U^l_i$ as the result of applying the nonlinear activation function a to $x^l_i$ and adding a predetermined bias $b^l_i$.

As the nonlinear activation function σ, for example, the ReLU may also be used.

The neuron data obtained from the operation result obtained by using a neural network is output to the identification layer and identification is performed in the identification layer. For example, the neuron data obtained from the operation result obtained by using the convolutional neural network illustrated in FIG. 1 is output to the identification layer and identification of the images is performed in the identification layer. For example, when performing identification of an identification target captured on an image from among 10 types, in the fully connected layer, 10 pieces of neuron data are output as the operation result. In the identification layer, the type of image associated with the greatest neuron data is used as the identification result. Furthermore, when performing learning, an error is obtained by comparing the recognition result with the correct answer.

However, the neuron data that is the operation result obtained by using the neural network becomes the real number. The identification layer normalizes the neuron data of the operation result in order to easily identifying the result. For example, the identification layer normalizes the neuron data of the operation result to the range of 0 to 1 by using the activation function, such as the Softmax function, or the like. The Softmax function is obtained by generalizing a logistic function and normalizes an n-dimensional vector x that has an arbitrary real number to an n-dimensional vector σ (x) that has the real number in the section of (0,1) and in which the sum becomes 1. For example, in the identification layer, the operation of the Softmax function represented by Equation (6) below is performed.

$$\sigma(x_i) = \frac{\exp(x_i)}{\sum_{i=1}^{n} \exp(x_j)} \tag{6}$$

Consequently, n pieces of neuron data $x_i$ that are the operation result obtained by using the neural network are converted to probability distribution with the probability of σ (x) that is each of the recognition targets i. The identification layer uses the type of image associated with the neuron data having the maximum probability distribution as the identification result. Furthermore, when performing learning, the identification layer obtains an error by comparing the recognition result with the correct answer. For example, the identification layer obtains an error between the target probability distribution (correct answer) by using a cross entropy error function. For example, the identification layer performs the operation of the error function represented by Equation (7) below.

$$E = -\Sigma_{i=1}^n t_i \log(y_i) \tag{7}$$

where, $t_i$ is a target distribution and, if the recognition target i is the correct answer, 1 is set and, in the other case, 0 is set; and $y_i$ is the probability σ ($x_i$) of the recognition target i that has been subjected to the operation by using the neural networks.

Deep learning automatically learns the features by performing supervised learning by using a neural network. For example, in the error back propagation method typically used in supervised learning, recognition is performed by sequentially propagating pieces of learning purpose data in a neural network and an error is obtained by comparing the recognition result with the correct answer. Then, in the error back propagation method, the error between the recognition result and the correct answer is propagated in the neural network in a direction opposite to that at the time of recognition and the parameter of each of the layers of the neural network is changed and approached to the optimum solution.

In the following, an example of calculating an error will be described. For example, in the error back propagation method, as an error between at the time of recognition and the neuron data, a partial differential operation of the error function represented by Equation (8) below is performed.

$$\frac{\partial E}{\partial x_i^L} = y_i - t_i \tag{8}$$

In the error back propagation method, the gradient of the error of the parameter in an output layer L is calculated from Equation (9) below. Furthermore, in the identification layer in which the Softmax function operation is performed, the result of Equation (8) corresponds to the gradient of the error obtained from Equation (9).

$$\frac{\partial E}{\partial x_i^L} = \sigma'(x_i^L) \frac{\partial E}{\partial y_i^L} \tag{9}$$

Furthermore, in the error back propagation method, the gradient from the error in the output layer L to the error at the time of input is calculated by using a partial differential. For example, in the layer in which the operation of the activation function, such as the ReLU, or the like, is performed, the gradient of an input error is calculated from Equation (10-1) below. σ' (x) is obtained from Equation (10-2) below. A value used at the time of recognition is used for x. The gradient ($\delta E/\delta x^l_i$) of the error when σ' (x) is substituted into Equation (10-1). If no activation function is present, the operations of Equations (10-1) and (10-2) are skipped.

$$\frac{\partial E}{\partial x_j^l} = \sigma'(x_j^l)\frac{\partial E}{\partial y_j^l} \quad (10\text{-}1)$$

$$\sigma'(x) = \begin{cases} 0 & (x \leq 0) \\ 1 & (\text{otherwise}) \end{cases} \quad (10\text{-}2)$$

Furthermore, in the error back propagation method, regarding the layer that has a parameter (weighting) for the operation, the gradient of the error of the parameter is calculated. For example, in the fully-connected operation indicated by Equation (4), the gradient of the error of the parameter is calculated from Equation (11-1) below. Furthermore, in the convolution operation indicated by Equation (1), the gradient of the error of the parameter is calculated from Equation (11-2) below. Furthermore, regarding $y_i^l$ that is obtained from the calculation performed by using the chain rule of the partial differential, the value used at the time of recognition is used.

$$\frac{\partial E}{\partial w_{ij}^l} = y_i^l \frac{\partial E}{\partial x_j^{l+1}} \quad (11\text{-}1)$$

$$\frac{\partial E}{\partial w_{ab}} = \sum_{i=0}^{N-m}\sum_{j=0}^{N-m}\frac{\partial E}{\partial x_{ij}^l}\frac{\partial x_{ij}^l}{\partial w_{ab}} = \sum_{i=0}^{N-m}\sum_{j=0}^{N-m}\frac{\partial E}{\partial x_{ij}^l}y_{(i+a)(j+b)}^{l-1} \quad (11\text{-}2)$$

Furthermore, in the error back propagation method, the gradient of the error to the previous layer (L−1 layer) is calculated. For example, if a previous layer is the layer that performs the fully-connected operation, the gradient of the error to the previous layer is calculated from Equation (12-1) below. Furthermore, if the previous layer is the layer that performs the convolution operation, the gradient of the error to the previous layer is calculated from Equation (12-2) below. Furthermore, regarding $w_{ij}^l$ that is obtained from the calculation performed by using the chain rule of the partial differential, the value used at the time of recognition is used. Furthermore, if the previous layer is the layer that performs Max-Pooling, the gradient ($\delta E/\delta x_i^l$) of the error is added to the location in which the maximum value of the area of k×k is taken at the time of recognition. Furthermore, no operation is performed on the other locations other than the area of k×k.

$$\frac{\partial E}{\partial y_i^l} = \sum w_{ij}^l \frac{\partial E}{\partial x_j^{l+1}} \quad (12\text{-}1)$$

$$\frac{\partial E}{\partial y_{ij}^{l-1}} = \quad (12\text{-}2)$$

$$\sum_{a=0}^{m-1}\sum_{b=0}^{m-1}\frac{\partial E}{\partial x_{(i-a)(j-b)}^l}\frac{\partial x_{(i-a)(j-b)}^l}{\partial y_{ij}^{l-1}} = \sum_{a=0}^{m-1}\sum_{b=0}^{m-1}\frac{\partial E}{\partial x_{(i-a)(j-b)}^l}w_{ab}$$

In the error calculation, calculation of the gradient of the error of each layer is repeated by backwardly propagating the calculation through a neural network until the calculation reaches the top level layer of the neural network. For example, the gradient from the error of an L layer to the error of an input is calculated by using Equation (10-1). For example, if a lower layer is the identification layer, the error represented by Equation (10-1) is obtained by substituting the gradient of the error obtained from Equation (9). Furthermore, if a lower layer is other than the identification layer, the error of an input represented by Equation (10-1) is obtained by substituting the gradient of the error calculated from Equations (12-1) and (12-2). Furthermore, for example, the gradient of the error of the parameter represented by Equation (11-1) is obtained by substituting the error calculated from Equation (10-1). Furthermore, for example, the error of the previous layer represented by Equation (12-1) is obtained by substituting the error calculated from Equation (10-1). Then, in the error calculation, the parameters of all of the layers are updated in accordance with the errors.

Figure 3:
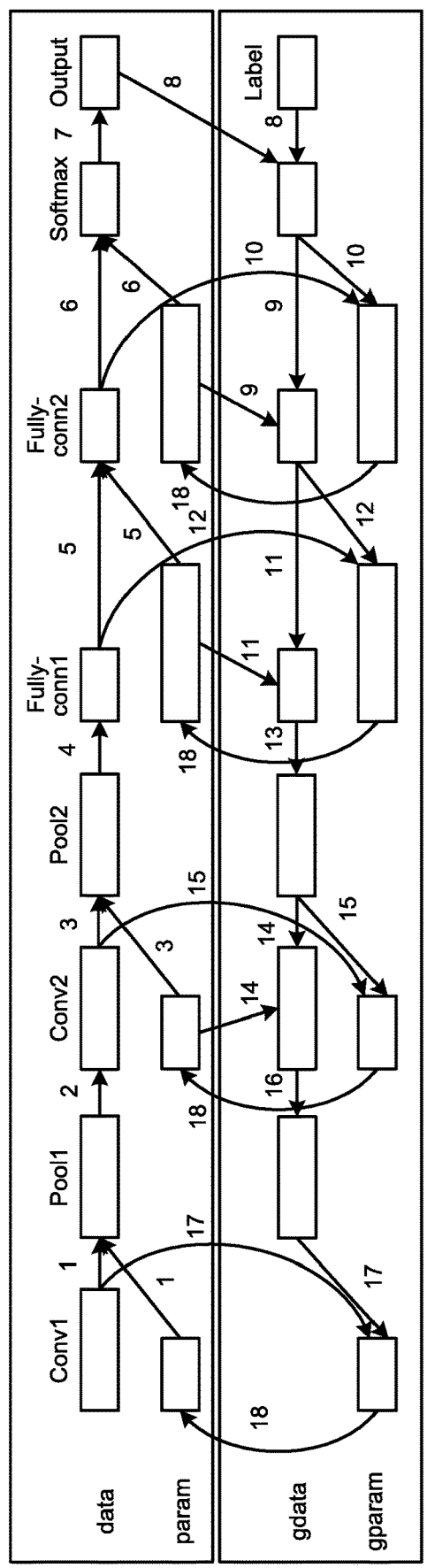
FIG. 3 is a diagram illustrating an example of the flow of calculation of a conventional neural network.

Here, an example of the flow of calculation performed in the conventional neural network will be described. FIG. 3 is a diagram illustrating an example of the flow of calculation of the conventional neural network. The example illustrated in FIG. 3 indicates each of the pieces of data and the order of the processes when learning of the convolutional neural network is performed as the neural network. It is assumed that the neural network has the hierarchical structure in which each of the layers is arranged in order. In the neural network, a first convolution layer (Conv1), a first pooling layer (Pool1), a second convolution layer (Conv2), a second pooling layer (Pool2), a first fully connected layer (Fully-conn1), a second fully connected layer (Fully-conn2), and an identification layer (Softmax) are arranged in order. The "data" indicates the data size of the neuron data in each layer. The "param" indicates the data size of the parameter in each layer. The "gdata" indicates the data size of the gradient of the error of the neuron data in each layer. The "gparam" indicates the data size of the gradient of the error of the parameter in each layer. Furthermore, because the first pooling layer, the second pooling layer, and the identification layer do not use the parameter in an operation, "param" and "gparam" are not present. The arrows indicate the flow of the processes at the time of learning of the neural network. The numbers attached to the arrows indicate the order of processes.

When learning of a neural network is performed, first, a recognition process that identifies an image that is the learning target is performed. For example, in the recognition process, a process each of the layers is performed on the image that is the learning target in the order of the numbers indicated by "1" to "7" and the processing result is output (Output). Then, when learning of a neural network is performed, secondly, a learning process that updates the parameters based on the processing results obtained from the recognition process is performed. For example, in the learning process, an error is obtained by comparing the identification result with the correct answer, as indicated by the number "8". The Label indicates the correct answer of the image that is the learning target. Then, in the learning process, regarding the error between the recognition result and the correct answer, the process of calculating the gradient of the error in each of the layers is performed in the order of the numbers "9" to "17". Then, in the learning process, as indicated by the number "18", a process of changing the parameter of each of the layers is performed. The change in the parameters may also be performed at the timing in which the gradient of the error is calculated for each layer.

Here, the gradient (gdata) of the error of the neuron data of each layer is calculated from both the gradient (gdata) of the error in the previous layer and the parameter (param) at the time of recognition. For example, in the second fully connected layer, as indicated by "9", the gradient (gdata) of the error of the neuron data is calculated from both the gradient (gdata) of the error of the identification layer and the parameter (param) of the second fully connected layer. Furthermore, the gradient (gparam) of the error of the parameter of each layer is calculated from both the gradient (gdata) of the error of the previous layer and the neuron data (data) at the time of recognition. For example, in the second fully connected layer, as indicated by "10", the gradient (gparam) of the error of the parameter is calculated from both the gradient (gdata) of the error of the identification layer and the neuron data (data) of the second fully connected layer. In this way, in learning of the neural network, the parameter and the neuron data at the time of recognition are used. Consequently, in the conventional deep learning, when learning is performed, neuron data (data) and the parameter (param) at the time of recognition of the input data that is used for the learning are stored. Furthermore, in the conventional deep learning, when the learning is performed, both the gradient (gdata) of the error of the neuron data and the gradient (gparam) of the error of the parameter are also stored. In this way, at the time of learning, the amount of memory used is increased.

In deep learning, if learning is performed on a lot of images as input data that is used for the learning, there is a method of performing an iterative learning process in which all of the pieces of the input data are collectively processed at a time. However, regarding the input data that is used for the learning, the number of pieces of data is sometimes extremely great. For example, regarding the input data that is used for the learning, the number of pieces of data is sometimes tens of thousands to several millions. In deep learning, if the iterative learning process is collectively performed on the input data at a time, the time taken to return after all of the processes are completed is long. Furthermore, in deep learning, because the operation result of each layer in the neural network is stored for each of the pieces of input data, the amount of memory used is increased. Thus, there is a mini-batch method that divides the input data into a predetermined number of pieces and that repeats the batch process of the learning. In the mini-batch method, for example, the input data is divided into M pieces and stochastic batch repetition is performed. In this case, for example, the parameter is updated by using Equation (13) below.

$$W_{t+1} = W_t + \frac{\eta}{|M|} \sum_{m=1}^{M} \frac{\partial E}{\partial w_t} \quad (13)$$

where, $W_t$ is the value of the parameter before the update; $W_{t+1}$ is the value of the parameter after the update; and $\eta$ is a learning rate indicating the percentage of the operated error that is reflected in the parameter that is before the update.

Figure 4:
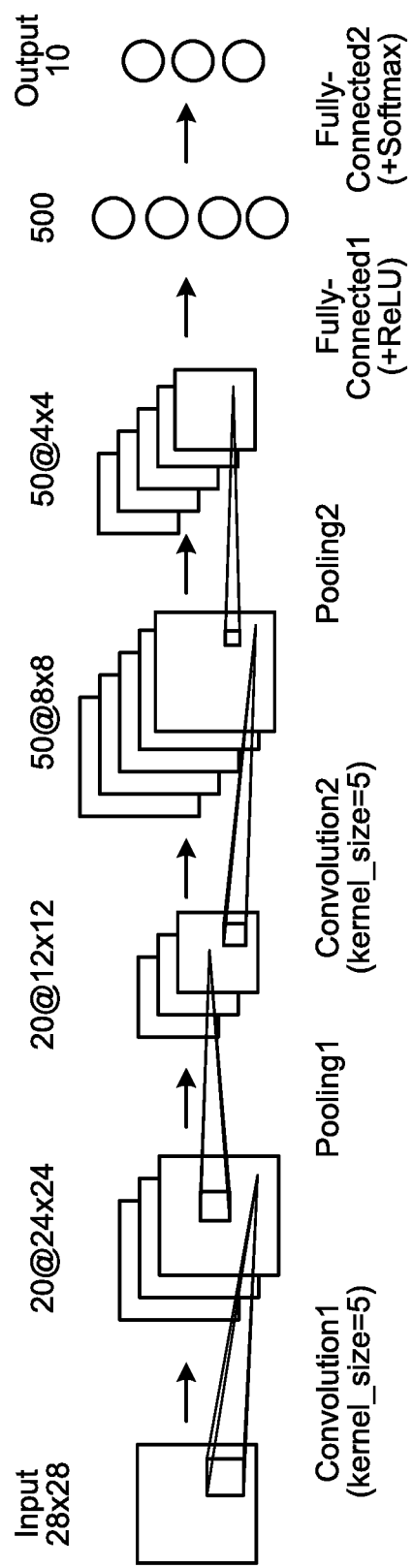
FIG. 4 is a schematic diagram illustrating an example of the flow of a process of a LeNet.

In the following, an example of an amount of conventional memory used will be described. For example, a description will be given of the amount of memory used in a case of using the neural network with the LeNet architecture introduced by LeCun et al. FIG. 4 is a schematic diagram illustrating an example of the flow of the process of a LeNet. In the example illustrated in FIG. 4, the image of 28×28 pixels is input as the neuron data (Input). In the first convolution layer (Convolution1), a convolution operation is performed on each of the pieces of the neuron data of 28×28 pixels by using 20 filters of size 5×5 and 20 pieces of neuron data of 24×24 pixels are calculated. Then, in the first pooling layer (Pooling1), Max-Pooling that extracts, for each 2×2 area, the maximum value of the 20 pieces of neuron data of 24×24 pixels and the 20 pieces of neuron data of 12×12 pixels are calculated. Then, in the second convolution layer (Convolution2), a convolution operation is performed on each of the pieces of the 20 pieces of neuron data of 12×12 pixels by using 50 filters of size 5×5 and 50 pieces of neuron data of 8×8 pixels are calculated. Then, in the second pooling layer (Pooling2), Max-Pooling that extracts, for each 2×2 area, the maximum value of the 50 pieces of neuron data of 8×8 pixels and the 50 pieces of neuron data of 4×4 pixels are calculated. Then, in the first fully connected layer (Fully-Connected1), in the neural network, each of the 50 pieces of neuron data of 4×4 pixels are fully connected as 500 units, a ReLU operation is performed in each of the units, and 500 pieces of neuron data are calculated. Then, in the second fully connected layer (Fully-Connected2), in the neural network, the 500 pieces of neuron data are fully connected as 10 units, an operation of the Softmax function is performed, and 10 pieces of neuron data are calculated.

FIG. 5 is a diagram illustrating an example of an amount of conventional memory used. The example illustrated in FIG. 5 indicates the amount of memory used in a case in which the input data is divided into units of 64 pieces (batch size M=64) and the process is performed on the neural network illustrated in FIG. 4.

For example, at the time of recognition of an image, as an input (Input), the memory of 50,176 bytes is used to store the neuron data. In the first convolution layer (Convolution1), the memory of 737,280 bytes is used to store the neuron data and the memory of 500 bytes is used to store the parameters. In the first pooling layer (Pooling1), the memory of 184,320 bytes is used to store the neuron data. In the second convolution layer (Convolution2), the memory of 204,800 bytes is used to store the neuron data and the memory of 25,000 bytes is used to store the parameters. In the second pooling layer (Pooling2), the memory of 51,200 bytes is used to store the neuron data. In the first fully connected layer (Fully-Connected 1), the memory of 32,000 bytes is used to store the neuron data and the memory of 400,000 bytes is used to store the parameters. In the second fully connected layer (Fully-Connected2), the memory of 640 bytes is used to store the neuron data and the memory of 5,000 bytes is used to store the parameters. Furthermore, in the process of the Softmax function, the memory of 640 bytes is used to store the neuron data. Consequently, in recognition of the image, if the batch size M is 64, as the result of multiplying 64 (4 bytes) by each amount, the memory of a total of 5.04 MB is used to store the neuron data and the memory of 1.72 MB is used to store the parameters.

Furthermore, at the time of learning, the memory of the same size as that used at the time of recognition of an image is used. Namely, also at the time of learning, the memory of a total of 5.04 MB is used to store the neuron data and the memory of 1.72 MB is used to store the parameters.

In the first embodiment, a description will be given of an information processing device that performs deep learning by reducing the amount of memory used at the time of learning.

Configuration of the Information Processing Device

Figure 6:
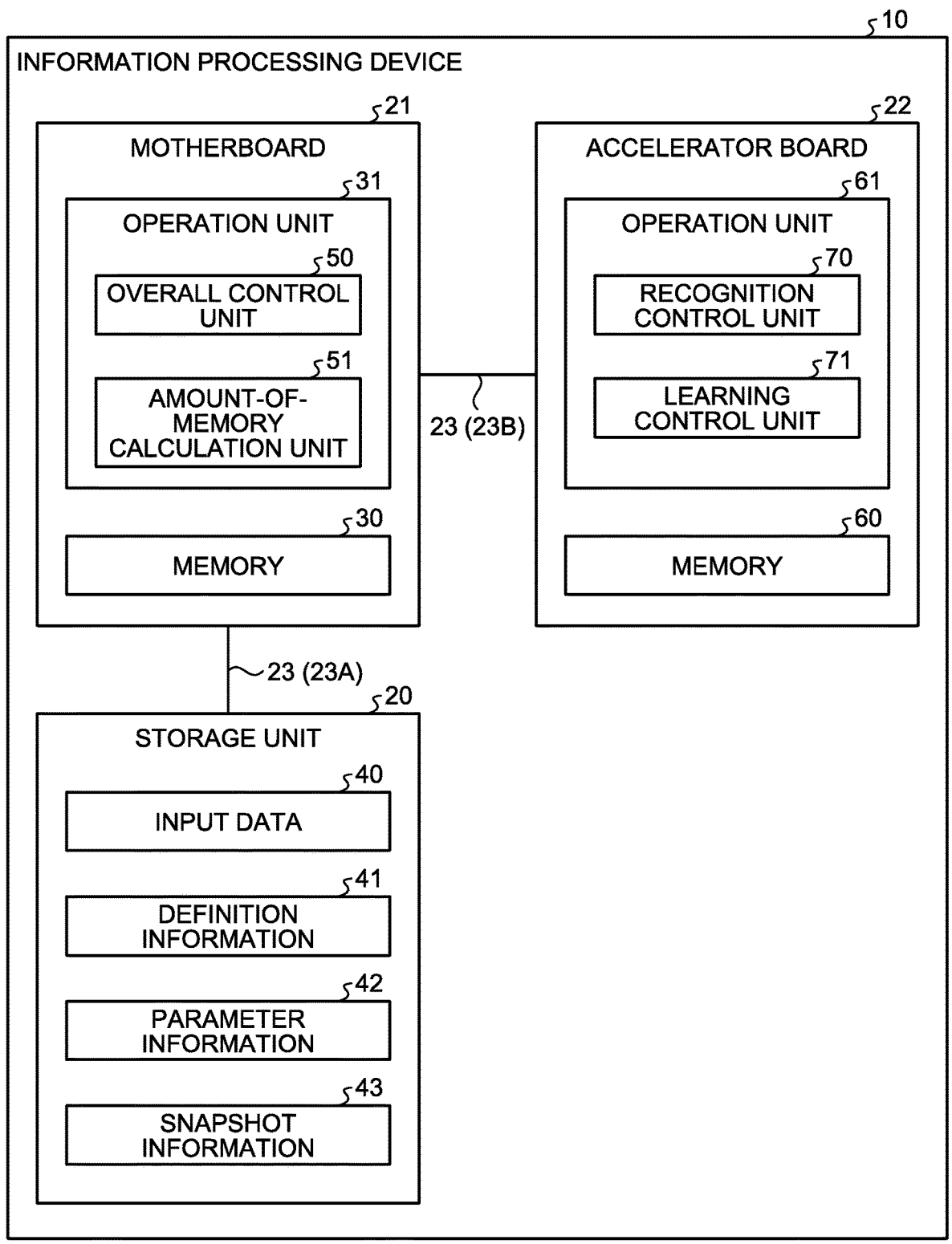
FIG. 6 is a diagram illustrating, in outline, the functional configuration of an information processing device.

The configuration of an information processing device 10 according to the first embodiment will be described. FIG. 6 is a diagram illustrating, in outline, the functional configuration of the information processing device. The information processing device 10 is a recognition device that recognizes various kinds of targets by using deep learning. For example, the information processing device 10 is a computer, such as a server computer, or the like. The information processing device 10 may also be mounted as a single computer or may also be mounted as a computer system constituted from a plurality of computers. Namely, the process of deep learning described below may also be performed in an information processing system constituted from a plurality of computers in a distributed manner. Furthermore, in the embodiment, a case in which the information processing device 10 is used as a single computer will be described as an example. In the embodiment, a case in which the information processing device 10 recognizes an image will be described as an example.

As illustrated in FIG. 6, the information processing device 10 includes a storage unit 20, a motherboard 21, and an accelerator board 22. Furthermore, the information processing device 10 may also include another unit described above. For example, the information processing device 10 may also include an input unit that receives various kinds of operations, a displaying unit that displays various kinds of information, or the like.

The storage unit 20 is a storage device, such as a hard disk, a solid state drive (SSD), or the like. The motherboard 21 is a board on which parts serving the main function of the information processing device 10 are mounted. The accelerator board 22 is a board on which hardware that is additionally used is mounted in order to increase the throughput of the information processing device 10. A plurality number of the accelerator boards 22 may also be provided. Furthermore, in the embodiment, a case in which a single number of the accelerator board 22 is provided is described as an example.

The storage unit 20, the motherboard 21, and the accelerator board 22 are connected by a bus 23 that can transfer data. For example, the storage unit 20 and the motherboard 21 are connected by a bus 23A, such as a serial ATA (SATA), a serial attached SCSI (SAS), or the like. Furthermore, the motherboard 21 and the accelerator board 22 are connected by a bus 23B, such as a peripheral component interconnect (PCI) express, or the like.

Deep learning performs a lot of operations. Consequently, in the information processing device 10, the operation is performed on the accelerator board 22 by using an accelerator, such as a Graphics Processing Unit (GPU), a dedicated chip, or the like, thus speeding up the process.

The storage unit 20 stores therein an operating system (OS) and various kinds of programs that execute various kinds of processes, which will be described later. Furthermore, the storage unit 20 stores therein various kinds of information. For example, the storage unit 20 stores therein input data 40, definition information 41, parameter information 42, and snapshot information 43. Furthermore, the storage unit 20 may also store therein various kinds of other information.

The input data 40 is data that is to be input to the neural network. For example, when performing supervised learning, the input data 40 is the data used for the learning. For example, if the feature of the identification target captured on an image is learned by a neural network, the input data 40 is the data in which a lot of images on which various kinds of identification targets are captured are associated with the labels indicating the correct answer of the identification target. Furthermore, when recognition is performed by using a neural network, the input data 40 is the data that is the identification target. For example, if the identification target captured on an image is recognized, the input data 40 is the data of the image that is the identification target.

The definition information 41 is the data that stores therein information related to the neural network. For example, the definition information 41 stores therein the information indicating the configuration of the hierarchical structure of the neural network or the unit of each hierarchy or the configuration of the neural network, such as the connection relation between the units, or the like. When performing image recognition, the definition information 41 stores therein the information indicating the configuration of the convolutional neural network defined by, for example, a designer, or the like.

The parameter information 42 is the data that stores therein the value of the parameter, such as a weighting value, or the like, that is used in an operation in each layer of the neural network. In the initial state, the value of the parameter stored in the parameter information 42 is a predetermined initial value and is updated in accordance with the learning.

The snapshot information 43 is data that stores therein information related to the state of the midstream of the process if the input data is divided into predetermined pieces and a batch process of the learning is repeated.

The motherboard 21 includes a memory 30 and an operation unit 31.

The memory 30 is, for example, a semiconductor memory, such as a random access memory (RAM), or the like. The memory 30 stores therein various kinds of information that are related to or used in the process performed in the operation unit 31.

The operation unit 31 is a device that performs control of the overall of the information processing device 10. As the operation unit 31, an electronic circuit, such as a central processing unit (CPU), a micro processing unit (MPU), or the like, may be used. The operation unit 31 functions as various kinds of processing units by various kinds of programs being operated. For example, the operation unit 31 includes an overall control unit 50 and an amount-of-memory calculation unit 51.

The overall control unit 50 controls the entire process related to deep learning. If the overall control unit 50 receives an instruction to start a process of deep learning, the overall control unit 50 reads various kinds of programs or information related to the deep learning from the storage unit 20. For example, the overall control unit 50 reads various kinds of programs that control the processes of the deep learning. Furthermore, the overall control unit 50 reads the definition information 41 and the parameter information 42. The overall control unit 50 specifies the configuration of the neural network based on the definition information 41 and the parameter information 42 and decides the processing order of the recognition process and the learning process of the neural network. Furthermore, the overall control unit 50 may also decides the processing order of the learning process at the timing in which the learning process is started.

The overall control unit 50 reads, from the storage unit 20, the input data 40 by dividing the input data 40 into predetermined pieces. Then, the overall control unit 50 offloads the read input data 40, the recognition process, and the information related to the learning process to the accelerator board 22. Then, the overall control unit 50 controls the accelerator board 22 and allows the accelerator board 22 to perform the recognition process and the learning process on the neural network.

The amount-of-memory calculation unit 51 calculates the amount of memory used to store the data in deep learning. For example, the amount-of-memory calculation unit 51 calculates, based on the definition information 41, in each of the layers of the neural network, the amount of memory used to store the neuron data, the parameters, the errors of the neuron data, and the errors of the parameters.

The accelerator board 22 includes a memory 60 and an operation unit 61.

The memory 60 is, for example, a semiconductor memory, such as a RAM, or the like. The memory 60 stores therein information on the process performed by the operation unit 61 of various kinds of information used in a process.

The operation unit 61 is a device that controls the accelerator board 22. As the operation unit 61, an electronic circuit, such as a graphics processing unit (GPU), an application specific integrated circuit (ASIC), a field-programmable gate array (FPGA), or the like, may also be used. The operation unit 61 functions as various kinds of processing units by various kinds of programs being operated in accordance with the control from the overall control unit 50. For example, the operation unit 61 includes a recognition control unit 70 and a learning control unit 71.

The recognition control unit 70 controls the recognition process of the neural network. For example, the recognition control unit 70 performs the recognition process in accordance with the processing order by using the input data that is offloaded from the motherboard 21 as the neuron data. For example, the recognition control unit 70 performs, with respect to the neuron data, an operation of each of the layers of the neural network and holds the neuron data and the parameter of each of the layers of the subject neural network in the memory 60.

The learning control unit 71 controls the learning process of the neural network. For example, the learning control unit 71 obtains an error between the identification result of the recognition process and the correct answer and performs, in accordance with the processing order, the learning process that propagates the error to the neural network. For example, the learning control unit 71 calculates the gradient of the error of each layer in the neural network from the error and learns the parameters. At this time, regarding the layer in which the neuron data and the parameter are held in the memory areas, the learning control unit 71 calculates the error of the parameter and then calculates the error of the neuron data. For example, regarding the memory area in which the neuron data and the parameter are held in the memory areas, the learning control unit 71 calculates the error of the parameter first. The learning control unit 71 performs control of holding the calculated error of the parameter in a new memory area in the memory 60. Then, the learning control unit 71 calculates the error of the neuron data. The learning control unit 71 performs control of overwriting and holding the calculated error of the neuron data in the memory area in which the neuron data obtained from the recognition process in the memory 60 is held.

Figure 7:
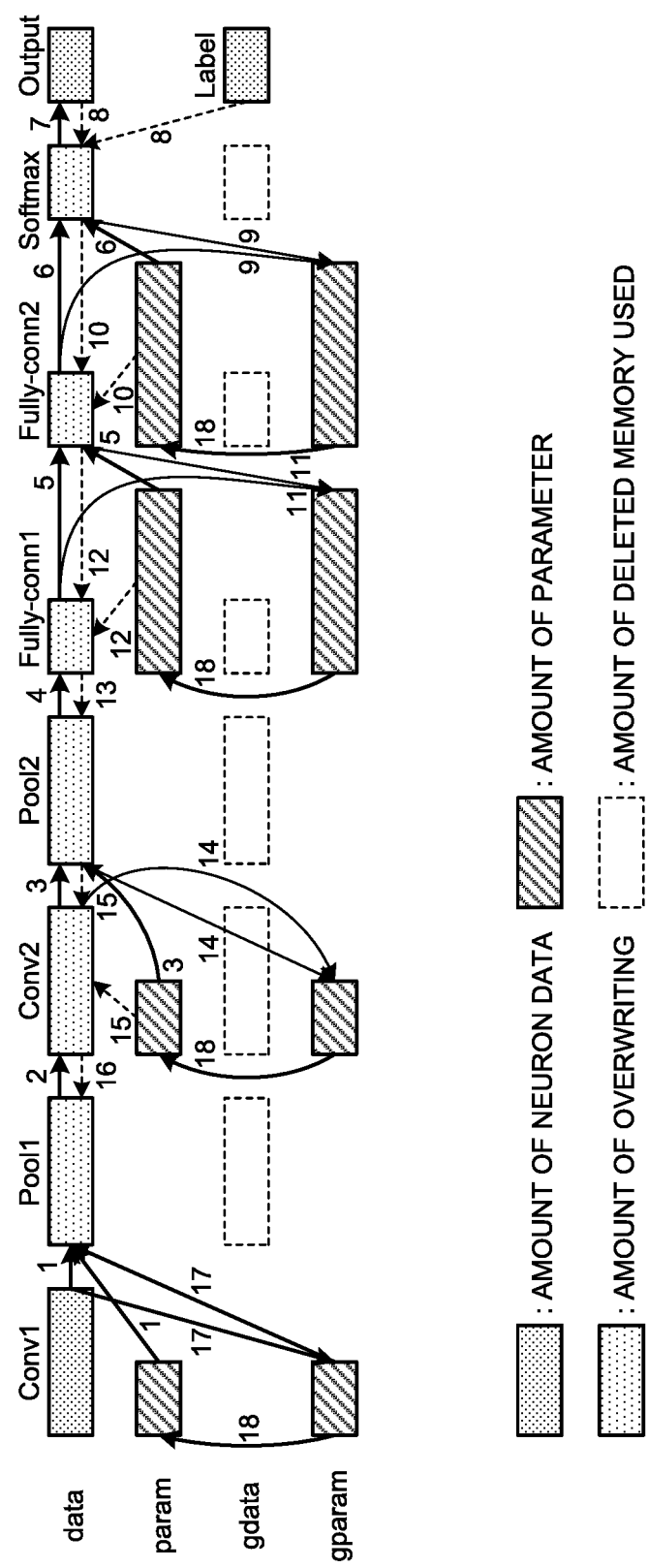
FIG. 7 is a diagram illustrating an example of the flow of calculation of a neural network according to a first embodiment.

In the following, an example of the flow of calculating a neural network according to the embodiment will be described. FIG. 7 is a diagram illustrating an example of the flow of calculation of the neural network according to the first embodiment. FIG. 7 indicates the flow of calculation in a case in which the same process of the neural network illustrated in FIG. 3 is performed by the information processing device 10 according to the embodiment. The neural network has the hierarchical structure in which each of the layers is arranged in order. In the neural network, the first convolution layer (Conv1), the first pooling layer (Pool1), the second convolution layer (Conv2), the second pooling layer (Pool2), the first fully connected layer (Fully-conn1), the second fully connected layer (Fully-conn2), and the identification layer (Softmax) are arrange in order. The "data" indicates the data size of the neuron data of each layer. The "param" indicates the data size of the parameter of each layer. The "gdata" indicates the data size of the gradient of the error of the neuron data of each layer. The "gparam" indicates the data size of the gradient of the error the parameter of each layer. Furthermore, because the first pooling layer, the second pooling layer, and the identification layer do not use the parameters in an operation, "param" and "gparam" are not present. The arrows indicate the flow of the process at the time of learning of the neural network. The number attached to the arrow indicates the order of processes.

When learning of a neural network is performed, the recognition control unit 70 performs the recognition process that identifies the image that is the learning target. For example, similar to the calculation of the conventional neural network illustrated in FIG. 3, the recognition control unit 70 performs the process on each of the layers in the order of the numbers "1" to "7" and outputs the processing results (Output). For example, in the first convolution layer (Conv1) and the second convolution layer (Conv2), a process of holding each of the calculated amounts of convolution in the memory 60 is performed based on the neuron data and the parameter. Furthermore, in the first pooling layer (Pool1) and the second pooling layer (Pool2), a process of thinning out is performed with respect to each of the amounts of convolution of the previous layers held in the memory 60 is performed and then a process of holding each of the amounts of thinned out convolution in each of the memory areas in the memory 60 is performed. Furthermore, in the first fully connected layer (Fully-conn1) and the second fully connected layer (Fully-conn2), a process of holding, in the memory 60, each of the output results obtained by adding up the weight of each layer held in the memory 60 to the amount of convolution of each previous layer held in the memory 60 is performed. Furthermore, in the identification layer (Softmax), a process of normalizing the output result of the previous layer held in the memory 60 and holding the normalized output result in the memory 60 is performed.

When learning of a neural network is performed, then, the learning control unit 71 performs the learning process of updating the parameter from the error that is obtained from the identification result of the recognition process. For example, similar to the calculation of the conventional neural network illustrated in FIG. 3, as indicated by the number "8", the recognition control unit 70 obtains the error by comparing the identification result with the correct answer. Then, the recognition control unit 70 calculates the gradient of the error of each layer in the order of the numbers "9" to "17". Then, as indicated by the number "18", the recognition control unit 70 changes the parameter of each of the layers. The change in the parameter of each of the layers may also be performed after the timing in which the gradient of the error is calculated for each layer. Furthermore, the first convolution layer (Conv1) is the top level layer on the input side and the gradient of the error of the neuron data do not need to be transferred to the adjacent layer in order to learn the parameter. Consequently, in the first convolution layer (Conv1), a process of calculating the gradient of the error of the neuron data may also be omitted. In the example illustrated in FIG. 7, the process of the gradient of the error of the neuron data in the first convolution layer (Conv1) is omitted.

For example, the learning control unit 71 overwrites and holds the gradient of the error of the output result, which is calculated based on the output result of the identification layer (Softmax) held in the memory 60, in the memory area in which the output result of the identification layer (Softmax) in the memory 60 is held. Consequently, compared with the conventional neural network, it is possible to reduce the memory area that stores therein the gradient of the error of the identification layer (Softmax).

Furthermore, regarding the layer in which both the neuron data and the parameter are held in the memory areas, the learning control unit 71 performs control of calculating the error of the parameter and holding the calculated the error of the parameter in a new memory area in the memory 60. Then, the learning control unit 71 calculates the error of the neuron data. The learning control unit 71 performs control of overwriting and holding the calculated error of the neuron data in the memory area, in the memory 60, in which the neuron data obtained from the recognition process is held. In the example illustrated in FIG. 7, the first convolution layer (Conv1), the second convolution layer (Conv2), the first fully connected layer (Fully-conn1), and the second fully connected layer (Fully-conn2) hold the neuron data and the parameters in the memory areas. Regarding these layers, the learning control unit 71 calculates each of the errors of the parameters and holds the result in the new memory area in the memory 60. Then, the learning control unit 71 performs control of calculating the error of the neuron data and overwriting and holding the error of the subject neuron data in the memory area, in the memory 60, in which the neuron data obtained from recognition process is held. For example, in a case of the second fully connected layer (Fully-conn2), as indicated by the number "9", the learning control unit 71 calculates the error of the parameter from both the gradient (gdata) of the error of the identification layer and the neuron data (data) of the second fully connected layer. The learning control unit 71 performs control of holding the calculated error of the parameter in a new memory area in the memory 60. Then, as indicated by the number "10", the learning control unit 71 calculates the error of the neuron data from both the gradient (gdata) of the error of the identification layer and the parameter (param) of the second fully connected layer. The learning control unit 71 performs control of overwriting and holding the calculated error of the neuron data in the memory area, in the memory 60, in which the neuron data obtained from the recognition process is held. Consequently, compared with the calculation of the conventional neural network illustrated in FIG. 3, in the second convolution layer (Conv2), the first fully connected layer (Fully-conn1), and the second fully connected layer (Fully-conn2), it is possible to reduce the memory area that stores therein the gradient of the error of the neuron data.

Furthermore, regarding the layer in which the parameter is not present and the neuron data is held in the memory area, the learning control unit 71 calculates the gradient of the error of the neuron data. Then, the learning control unit 71 performs control of overwriting the calculated gradient of the error of the neuron data in the memory area used by the neuron data obtained from the recognition process held in the memory 60. In the example illustrated in FIG. 7, the first pooling layer (Pool1) and the second pooling layer (Pool2) hold the neuron data in the memory area. Regarding the first pooling layer (Pool1) and the second pooling layer (Pool2), the learning control unit 71 calculates the gradient of the error of the neuron data. Then, as indicated by the numbers "13" and "16", the learning control unit 71 overwrites the gradient of the error of the neuron data in the memory area used by the neuron data obtained from the recognition process held in the memory 60. Consequently, compared with the calculation of the conventional neural network illustrated in FIG. 3, in the first pooling layer (Pool1) and the second pooling layer (Pool2), it is possible to reduce the memory area that stores therein the gradient of the error of the neuron data.

In general, the storage capacity of the memory 60 mounted on the accelerator board 22 is small. As an example of the accelerator board 22, regarding the GeForce GTX TITAN X manufactured by NVIDIA Corporation, the storage capacity of the memory is 12 GB.

In deep learning, with multilayer structure of neural networks, the amount of memory used is increased and the amount of memory used is further increased at the time of learning. Consequently, in deep learning, if the process of calculating a neural network is performed on the accelerator board, there may be a case in which the process is limited depending on the storage capacity of the local memory on the accelerator board. For example, in deep learning, as the amount of memory used is increased in a single process, the number of processes that can be processed in a batch process performed by the accelerator board at a time is decreased; therefore, the time needed to learn the input data is increased.

Thus, it is conceivable that learning process is performed while saving the data from the accelerator board 22 to the motherboard 21. For example, it is conceivable that learning process is performed while saving the processed data from the accelerator board 22 to the motherboard 21 and transferring the data that is to be subsequently processed from the motherboard 21 to the accelerator board 22. However, it takes a long time to transfer the data between the accelerator board 22 and the motherboard 21 and thus the time needed to learn the input data is increased.

In contrast, the learning process according to the embodiment efficiently uses the memory at the time of learning. Consequently, for example, the batch size M that can be processed on the accelerator board 22 is increased. Consequently, if a reduction in the amount of memory used at the time of learning described in the embodiment is used, the time needed to learn the input data can be reduced.

Flow of the Process

Figure 8:
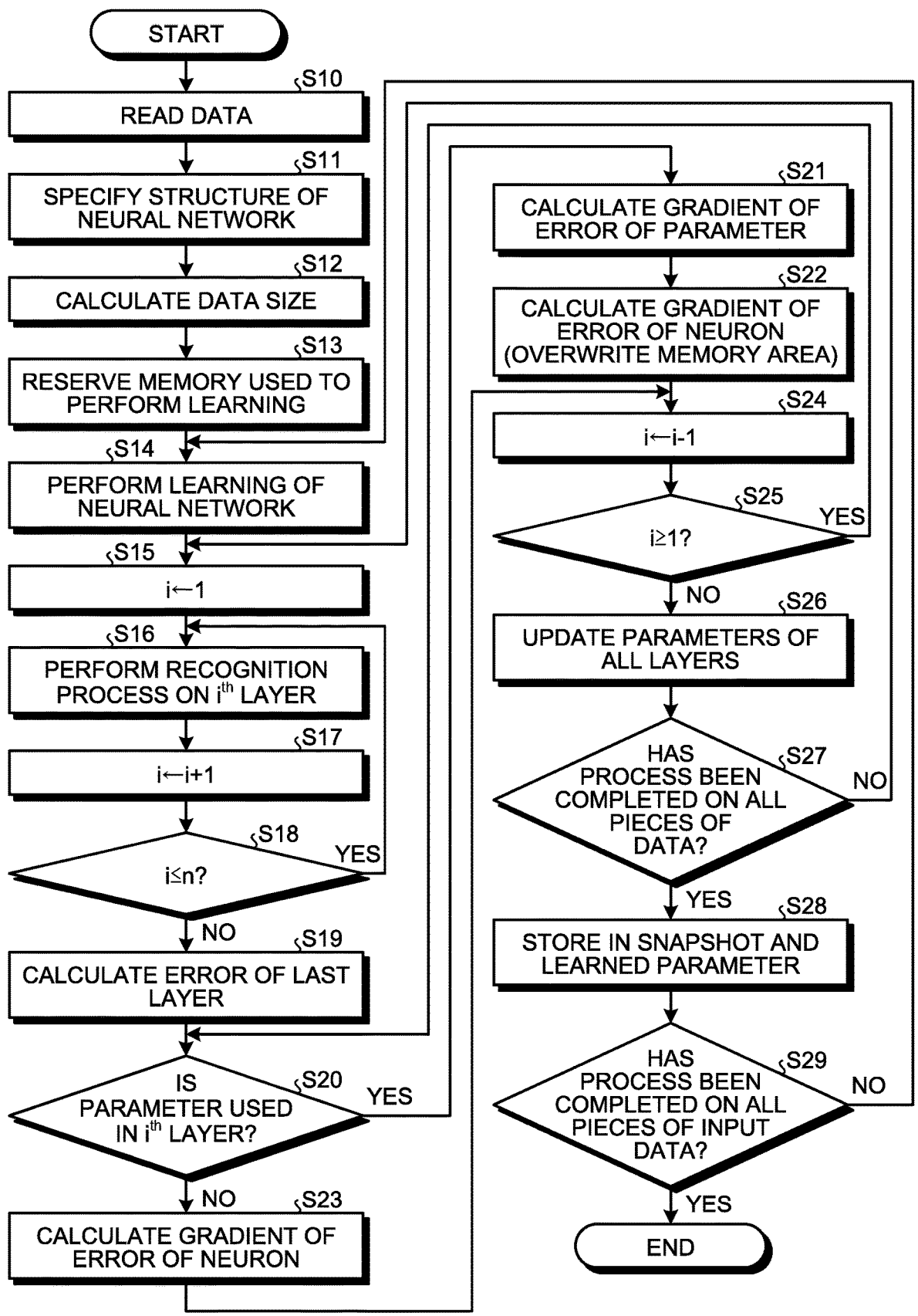
FIG. 8 is a flowchart illustrating an example of the flow of a recognition process according to the first embodiment.

In the following, the flow of the recognition process performed by the information processing device 10 according to the first embodiment will be described. FIG. 8 is a flowchart illustrating an example of the flow of a recognition process according to the first embodiment. This recognition process is performed at a predetermined timing, for example, at the timing in which an instruction to start the process is received from an administrator.

As illustrated in FIG. 8, the overall control unit 50 reads the definition information 41 and the parameter information 42 (Step S10). The overall control unit 50 specifies the structure of the neural network based on the definition information 41 and the parameter information 42 (Step S11). The amount-of-memory calculation unit 51 calculates, based on the definition information 41, the data size of the amount of memory used to store the error of the neuron data and the parameter of each of the layers of the neural network at the time of recognition and the learning (Step S12).

The overall control unit 50 controls the accelerator board 22 and reserves the storage area of the calculated data size in the memory 60 (Step S13).

The overall control unit 50 separately reads the input data 40 from the storage unit 20 by dividing the input data 40 into predetermined pieces. Then, the overall control unit 50 offloads information related to the read data, the recognition process, and the learning process to the accelerator board 22 and starts learning the neural network (Step S14).

The recognition control unit 70 initializes the parameter i to 1 (Step S15). The recognition control unit 70 reads the unprocessed one piece of data from the data that is offloaded from the motherboard 21. Then, the recognition control unit 70 sequentially performs, by using the read data as the neuron data, an operation on the neuron data in the $i^{th}$ layer of the neural network and holds the operation result in the memory 60 (Step S16). The recognition control unit 70 increments the value of the parameter i by 1 (Step S17).

The recognition control unit 70 determines whether the value of the parameter i is equal to or less than the number of the layers n of the neural network (Step S18). If the value of the parameter i is equal to or less than the number of the layers n of the neural network (Yes at Step S18), the recognition control unit 70 moves to the process at Step S16 described above.

In contrast, if the value of the parameter i is not equal to or less than the number of the layers n of the neural network (No at Step S18), the learning control unit 71 calculates the error between the identification result and the correct answer in the last layer of the neural network (Step S19).

The learning control unit 71 determines whether the parameter is used for the calculation in the $i^{th}$ layer of the neural network (Step S20). For example, in the example illustrated in FIG. 7, the first convolution layer (Conv1), the second convolution layer (Conv2), the first fully connected layer (Fully-conn1), and the second fully connected layer (Fully-conn2) hold the neuron data and the parameters in the memory area.

If the parameter is used for the calculation in the $i^{th}$ layer of the neural network (Yes at Step S20), the learning control unit 71 calculates the gradient of the error of the parameter and holds the calculation result in the memory 60 (Step S21). Then, the learning control unit 71 calculates the gradient of the error of the neuron data and overwrites and stores the calculated gradient in the storage area, in the memory 60, in which the neuron data in the $i^{th}$ layer of the neural network is stored (Step S22).

In contrast, if the parameter is not used for the calculation in the $i^{th}$ layer of the neural network (No at Step S20), the learning control unit 71 calculates the gradient of the error of the neuron data and holds the calculated gradient in the memory 60 (Step S23).

The learning control unit 71 decrements the value of the parameter i by 1 (Step S24). The recognition control unit 70 determines whether the value of the parameter i is equal to or greater than 1 (Step S25). If the value of the parameter i is equal to or greater than 1 (Yes at Step S25), the recognition control unit 70 moves to the process at Step S20 described above.

In contrast, if the value of the parameter i is not equal to or greater than 1 (No at Step S25), regarding all of the layers of the neural network, the learning control unit 71 updates, for each layer, parameter based on the gradient of the error of the parameter (Step S26).

The learning control unit 71 determines whether the process of all the pieces of the offloaded data has been completed (Step S27). If the process of all the pieces of the offloaded data has not been completed (No at Step S27), the process moves to the process at Step S15 described above.

In contrast, if the process of all the pieces of the offloaded data has been completed (Yes at Step S27), the overall control unit 50 stores the processing result in the snapshot information 43 and the parameter information 42 (Step S28).

The overall control unit 50 determines whether the learning of all of the pieces of the input data 40 has been completed (Step S29). If the learning of all of the pieces of the input data 40 has not been completed (No at Step S29), the overall control unit 50 moves to the process at Step S14 described above.

In contrast, if the learning of all of the pieces of the input data 40 has been completed (Yes at Step S29), the overall control unit 50 ends the process.

Effects

As described above, the information processing device 10 according to the embodiment controls the recognition process with respect to the input neuron data. For example, the information processing device 10 performs the operation of the hierarchical neural network including the weighting operation using the parameter and performs control of holding the neuron data and the parameter of each layer of the neural network in each of the memory areas. Furthermore, the information processing device 10 controls the learning process of learning the parameter of each layer of the neural network from the error obtained from the recognition result. For example, in the learning process, regarding the layer in which the neuron data and the parameter are held in the memory areas, the information processing device 10 performs control of calculating the error of the neuron data after calculating the error of the parameter. Consequently, the information processing device 10 can perform the process while overwriting the neuron data at the time of recognition in the storage area, thus efficiently uses the memory.

Furthermore, regarding the layer in which the neuron data and the parameter are held in the memory areas, the information processing device 10 according to the embodiment calculates the error of the parameter and holds the calculated error in a new memory area. Then, regarding the layer in which the neuron data and the parameter are held in the memory areas, the information processing device 10 performs control of calculating the error of the neuron data and overwriting and holding the calculated error of the neuron data in the memory area that holds the neuron data obtained from the recognition process. Consequently, the information processing device 10 can reduce the amount of memory used at the time of learning.

Furthermore, regarding the layer in which the neuron data and the parameter are held in the memory areas, the information processing device 10 according to the embodiment calculates the error of the parameter from the neuron data of the subject layer held at the time of the recognition process and the neuron data of the layer previous to the subject layer. Furthermore, regarding the layer in which the neuron data and the parameter are held in the memory areas, the information processing device 10 calculates the error of the neuron data from the parameter of the subject layer and the neuron data of the layer previous to the subject layer. Consequently, the information processing device 10 can calculate the error of the parameter of the layer in which the neuron data and the parameter are stored in the memory area and calculate the error of the neuron data.

[b] Second Embodiment

In the following, a second embodiment will be described. The configuration of the information processing device 10 according to the second embodiment is substantially the same as that of the information processing device 10 according to the first embodiment illustrated in FIG. 6; therefore, only the parts that differ will mainly be described.

The amount-of-memory calculation unit 51 calculates, based on the definition information 41, the amount of memory used to store, in each layer of the neural network, neuron data, the parameter, the error of the neuron data, and the error of the parameter.

The learning control unit 71 specifies the amount of memory used to store the error of the parameter of the layer in which the amount of memory used is the greatest out of the amount of memory used to store the error of the parameter of each layer calculated by the amount-of-memory calculation unit 51. Then, when starting the learning process, the learning control unit 71 reserves, as the storage area used for the parameter error, the memory area associated with the specified amount of memory used. In the learning process, regarding the layer in which the neuron data and the parameter are held in the memory areas, the learning control unit 71 sequentially performs the following process. The learning control unit 71 calculates the error of the parameter and overwrites and holds the error of the subject parameter in the storage area used for the parameter error. Then, the learning control unit 71 calculates the error of the neuron data and overwrites and holds the error of the subject neuron data in the memory area in which the neuron data obtained from the recognition process is held. Then, by using the error of the parameter held in the storage area that is used for the parameter error, the learning control unit 71 updates the parameter held at the time of the recognition process.

Figure 9:
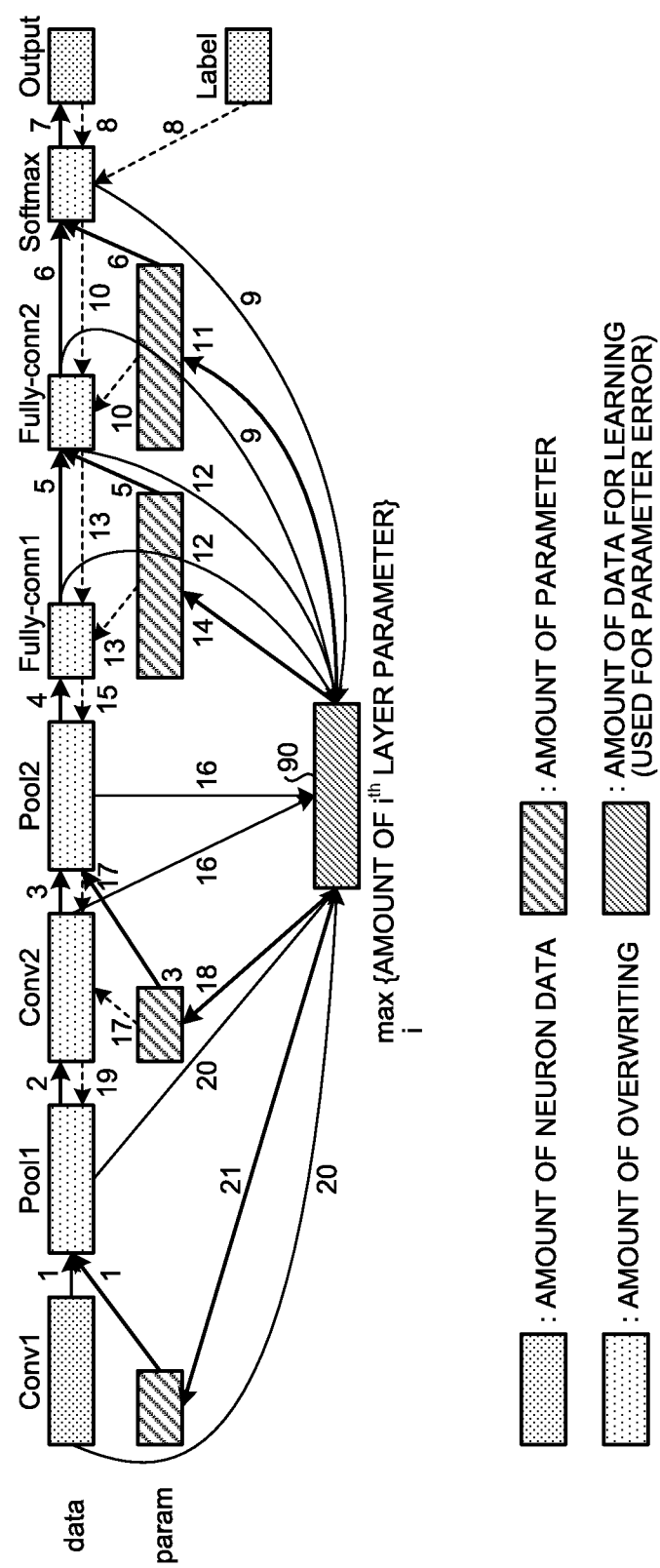
FIG. 9 is a diagram illustrating an example of the flow of calculation of a neural network according to a second embodiment.

In the following, an example of the flow of the calculation of the neural network according to the embodiment will be described. FIG. 9 is a diagram illustrating an example of the flow of calculation of a neural network according to a second embodiment. FIG. 9 indicates the flow of the calculation obtained when the same process of the neural network illustrated in FIGS. 3 and 7 is performed by the information processing device 10 according to the embodiment. It is assumed that the neural network has the same hierarchical structure as that illustrated in FIGS. 3 and 7. The "data" indicates the data size of the neuron data in each layer. The "param" indicates the data size of the parameter of each layer. The arrows indicate the flow of the process when the learning of the neural network is performed. The number attached to the arrow indicates the order of the process.

When learning of a neural network is performed, the recognition control unit 70 performs the recognition process that recognizes the image that is the learning target. For example, similar to the calculation of the neural network according to the first embodiment illustrated in FIG. 7, the recognition control unit 70 performs the process on each of the layers in the order of numbers "1" to "7" and outputs the processing results (Output).

When learning of a neural network is performed, the learning control unit 71 reserves a parameter error purpose storage area 90 in the memory 60. Then, the learning control unit 71 performs the learning process of updating the parameter from the error that is obtained from the identification result from the recognition process. At this time, regarding the layer in which the neuron data and the parameter are held in the memory areas, the learning control unit 71 performs, for each layer, control of calculating the error of the parameter and overwriting and holding the error of the subject parameter in the parameter error purpose storage area 90. Then, the learning control unit 71 performs control of calculating the error of the neuron data and overwriting and holding the error of the subject neuron data in the memory area in which the neuron data obtained from the recognition process is held. Then, by using the error of the parameter held in the parameter error purpose storage area 90, the learning control unit 71 performs control of updating the parameter held at the time of the recognition process.

For example, similar to the calculation of the neural network according to the first embodiment illustrated in FIG. 7, as indicated by the number "8", the recognition control unit 70 obtains the error by comparing the identification result with the correct answer. Then, the recognition control unit 70 calculates, in the order of the numbers "9" to "21", for each layer, the gradient of the error of the parameter and then updates the parameter after calculating the gradient of the error of the neuron data. Furthermore, the first convolution layer (Conv1) is the top level layer on the input side and the gradient of the error of the neuron data do not need to be transferred to the adjacent layer in order to learn the parameter. Consequently, in the first convolution layer (Conv1), a process of calculating the gradient of the error of the neuron data may also be omitted. In the example illustrated in FIG. 9, the process of the gradient of the error of the neuron data in the first convolution layer (Conv1) is omitted.

For example, in the example illustrated in FIG. 7, the first convolution layer (Conv1), the second convolution layer (Conv2), the first fully connected layer (Fully-conn1), and the second fully connected layer (Fully-conn2) hold the neuron data and the parameter in the memory area. Regarding these layers, the learning control unit 71 performs, for each layer, control of calculating the error of the parameter and overwriting and holding the error of the subject parameter in the parameter error purpose storage area 90. For example, in a case of the second fully connected layer (Fully-conn2), as indicated by the number "9", the learning control unit 71 calculates the error of the parameter and holds the calculated error of the parameter in the parameter error purpose storage area 90 in the memory 60. Then, as indicated by the number "10", the learning control unit 71 calculates the error of the neuron data and overwrites and holds the error of the subject neuron data in the memory area, in the memory 60, in which the neuron data obtained from the recognition process is held. Then, as indicated by the number "11", the learning control unit 71 updates the parameter held in the recognition process by using the error of the parameter held in the parameter error purpose storage area 90. Consequently, when compared with the calculation of the neural network illustrated in FIGS. 3 and 7, in the second convolution layer (Conv2), the first fully connected layer (Fully-conn1), and the second fully connected layer (Fully-conn2), it is possible to further reduce the memory area that stores therein the gradient of the error of the neuron data.

Flow of the Process

Figure 10:
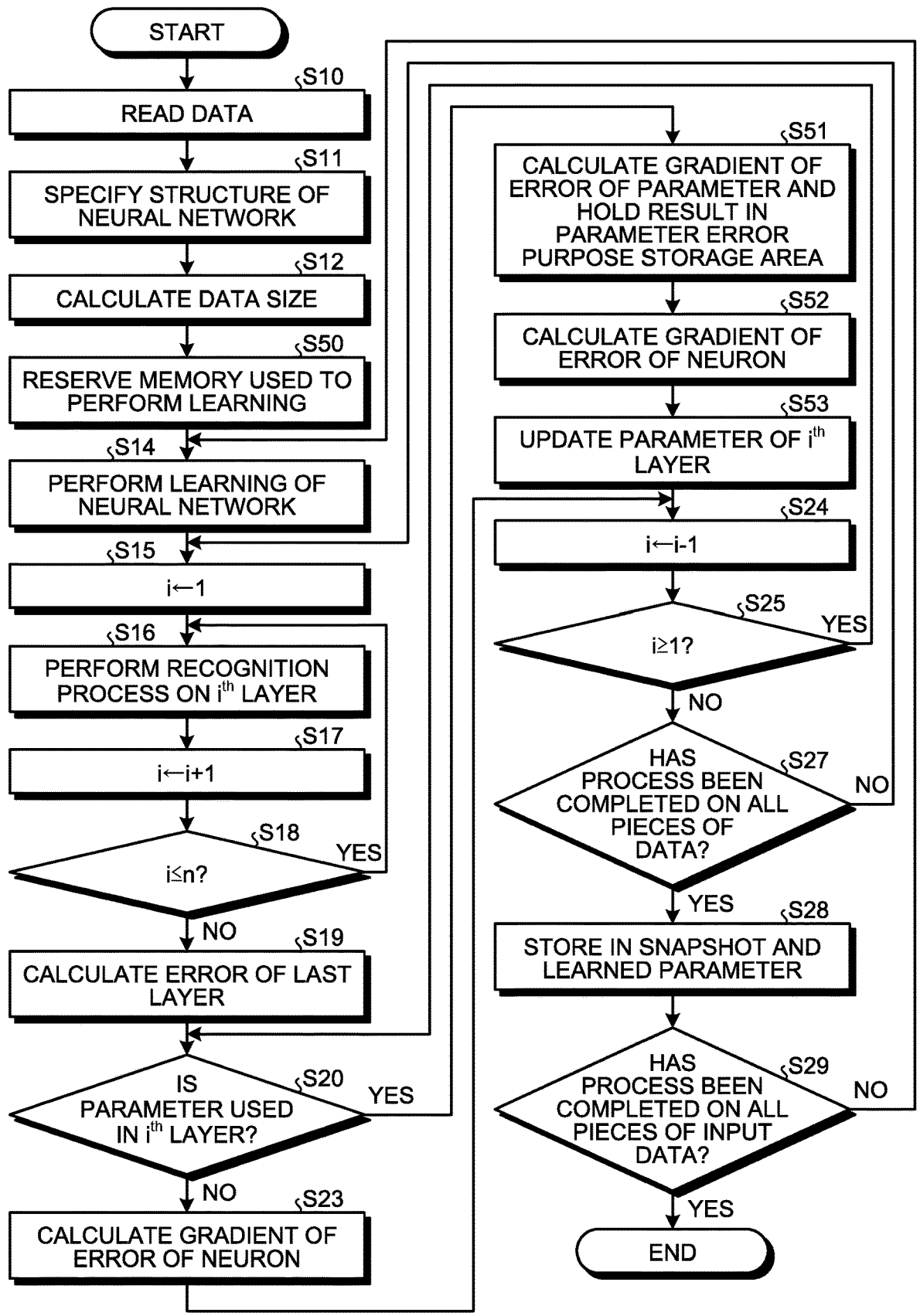
FIG. 10 is a flowchart illustrating an example of the flow of a recognition process according to the second embodiment.

In the following, the flow of the recognition process performed by the information processing device 10 according to the second embodiment will be described. FIG. 10 is a flowchart illustrating an example of the flow of the recognition process according to the second embodiment. A part of the recognition process according to the second embodiment is the same as the recognition process illustrated in FIG. 7; therefore, the same reference numerals are assigned to the same processes and new reference numerals are assigned to different processes.

The overall control unit 50 controls the accelerator board 22 and reserves the storage area of the calculated data size in the memory 60 (Step S50). At this time, the learning control unit 71 specifies the amount of memory used in the layer in which the amount of memory used is the greatest out of the amount of memory used to store the error of the parameter of each layer calculated at Step S12. Then, the learning control unit 71 reserves, as the parameter error purpose storage area 90, the memory area associated with the specified amount of memory used.

Furthermore, if the parameter is used for the calculation of the $i^{th}$ layer of the neural network (Yes at Step S20), the learning control unit 71 calculates the gradient of the error of the parameter and holds the calculated gradient in the parameter error purpose storage area 90 in the memory 60 (Step S51). Then, the learning control unit 71 calculates the gradient of the error of the neuron data and overwrites and holds the calculation result in the storage area, in the memory 60, in which the neuron data in the $i^{th}$ layer of the neural network is held (Step S52). Then, the learning control unit 71 updates, by using the error of the parameter held in the parameter error purpose storage area 90, the parameter of the $i^{th}$ layer held at the time of the recognition process (Step S53).

Effects

As described above, the information processing device 10 according to the embodiment calculates the amount of memory used to store the error of the parameter of each layer of the neural network. The information processing device 10 reserves the memory area associated with the amount of memory used in the layer in which the amount of memory used is the greatest out of the calculated amount of memory used in each layer. In learning process, regarding the layer in which the neuron data and the parameter are held in the memory areas, the information processing device 10 performs control of sequentially performs the following process for each layer. First, the information processing device 10 calculates the error of the parameter and overwrites and holds the error of the subject parameter in the reserved memory area. Then, the information processing device 10 calculates the error of the neuron data and overwrites and holds the error of the subject neuron data in the memory area in which the neuron data of the recognition process is held. Then, the information processing device 10 updates the parameter reserved in the recognition process by using the error of the parameter held in the reserved memory area. Consequently, the information processing device 10 can reduce the amount of memory used at the time of learning.

[c] Third Embodiment

In the above explanation, a description has been given of the embodiment of the device disclosed in the present invention; however, the present invention can be implemented with various kinds of embodiments other than the embodiment described above. Therefore, another embodiment included in the present invention will be described below.

For example, the information processing device 10 may also use another method, for example, stochastic gradient descent (SGT), such as a momentum method, or the like, for the learning. For example, in the momentum method, the value of the parameter $W_{t+1}$ is updated based on the linear sum of the gradient $\nabla E(W)$ of the error and the parameter $v_t$ of the previous cycle. For example, by using the parameter $v_t$ in the previous cycle and $W_t$, the updated parameter $v_{t+1}$ in a t+1 cycle and $W_{t+1}$ are calculated from Equations (14-1) and (14-2) below.

$$V_{t+1} = \mu V_t - \alpha \nabla E(W_t) \quad (14\text{-}1)$$

$$W_{t+1} = W_t + V_{t+1} \quad (14\text{-}2)$$

where, α is a learning rate and is the weighting factor with respect to the gradient of the error and μ is a momentum and is the weighting factor with respect to the parameter updated in the previous cycle.

Figure 11:
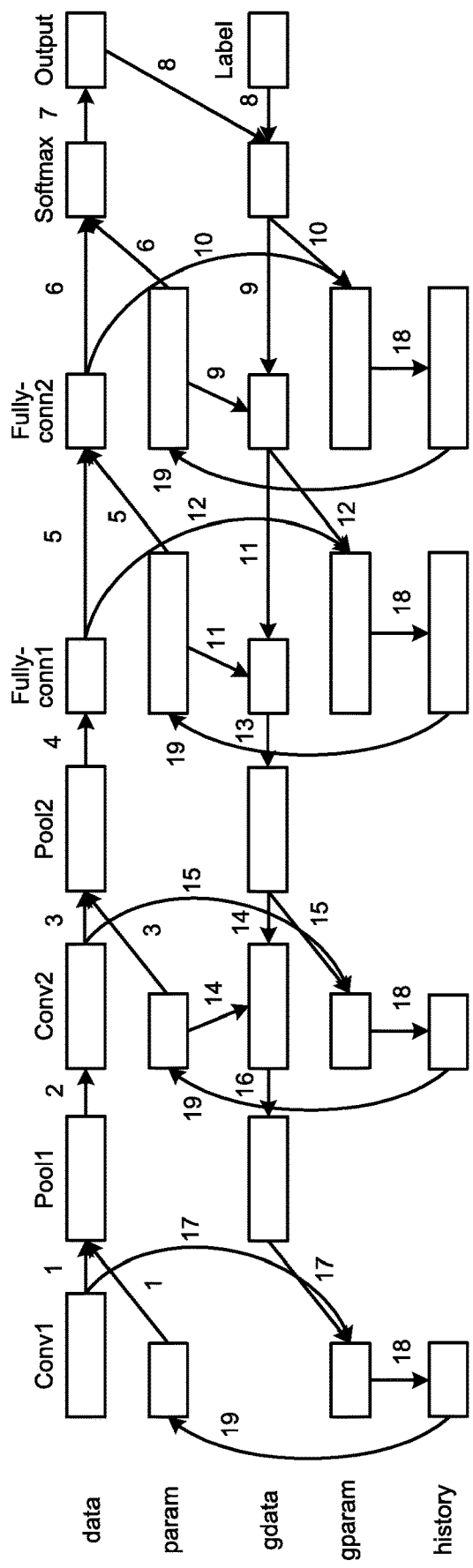
FIG. 11 is a diagram illustrating an example of the flow of calculation of a neural network performed by using a conventional momentum method.

In the following, an example of the flow of the calculation of the neural network performed by using the conventional momentum method will be described. FIG. 11 is a diagram illustrating an example of the flow of calculation of a neural network performed by using a conventional momentum method. It is assumed that the neural network has the same hierarchical structure as that illustrated in FIGS. 3 and 7. The "data" indicates the data size of the neuron data in each layer. The "param" indicates the data size of the parameter of each layer. The "gdata" indicates the data size of the gradient of the error of the neuron data of each layer. The "gparam" indicates the data size of the gradient of the error of the parameter of each layer. The "history" indicates the data size of the error information of the previous cycle. Furthermore, because the first pooling layer, the second pooling layer, and the identification layer do not use the parameter to perform the operation, "param" and "gparam" are not present. The arrows indicate the flow of the process at the time of learning of the neural network. The number attached to the arrow indicates the order of processes.

When learning of a neural network is performed, first, the recognition process that identifies the image that is the learning target. For example, in the recognition process, the process of each layer with respect to the image that is the learning target is performed in the order of the numbers "1" to "7" and the processing results are output (Output). Then, when learning of a neural network is performed, secondly, the learning process that updates the parameter based on the processing results obtained from the recognition process. For example, in learning process, as indicated by the number "8", the error is obtained by comparing the identification result with the correct answer. The Label indicates the correct answer of the image that is the learning target. Then, in the learning process, regarding the error between the recognition result and the correct answer, the process of calculating the gradient of the error of each layer is performed in the order of the numbers "9" to "17". Then, in the learning process, as indicated by the numbers "18" and "19", the process of changing the parameter of each of the layers is performed.

For example, the error of the parameter is calculated from Equation (15-1) in each layer at the time of learning process.

$$gw = bottom\_x \times top\_gx \quad (15\text{-}1)$$

Then, the difference used to update the parameter of each layer is calculated from Equations (15-2) and (15-3).

$$v = momentum \times v - lr \times gw \quad (15\text{-}2)$$

$$gw = v \quad (15\text{-}3)$$

Furthermore, the parameter of each layer may also be updated by using Equation (15-4) below.

$$w = w - gw \quad (15\text{-}4)$$

where, w is data of the parameter,
x is neuron data,
gw is error data of the parameter,
gx is error data of the neuron data,
bottom_x is x (neuron data) of a lower layer (adjacent layer on the output side),
top_gx is gx (error data of the neuron data) of a higher layer (adjacent layer on the input side), momentum represents a momentum and corresponds to µ, and lr represents a learning rate and corresponds to α.

Furthermore, if the magnitude of the error exceeds a threshold, learning may also be performed by limiting the error to the value equal to or lower than the threshold. If the learning process performed by using Clip Gradients, an error of the parameter is calculated from Equation (15-1) above in each layer at the time of learning process. Then, learning may also be performed by obtaining the sum of squares of errors of each of the layers and by limiting the sum of squares of errors to the value equal to or lower than the threshold. For example, at the end of the learning process, the sum of squares of errors (12_norm) is calculated from Equation (16-1) below in each layer. Then, the error data of the parameter used for an update may also be calculated from Equation (16-2) below.

$$12\_norm = \Sigma \ (gw \times gw) \quad (16\text{-}1)$$
$$\text{if } (12\_norm > clip\_gradients) \ \{$$
$$scale\_factor = clip\_gradients/12\_norm$$
$$gw = gw \times scale\_factor$$
$$\} \quad (16\text{-}2)$$

where, clip_gradients is a threshold.

Furthermore, the learning may also be performed by adding a restriction for preventing overlearning. The restriction includes, for example, L1 regularization and L2 regularization. For example, at the end of the learning process, the error data of the parameter may also be calculated from Equations (17-1) and (17-2) below in each layer.

$$ld = \text{lambda} \times w \quad (17\text{-}1)$$

$$gw = gw + ld \quad (17\text{-}2)$$

FIG. 12 is a diagram illustrating an example of an amount of conventional memory used. The example illustrated in FIG. 12 indicates the amount of memory used in a case in which the input data is divided into units of 64 pieces (batch size M=64) and the process is performed on the neural network illustrated in FIG. 11. In the example illustrated in FIG. 12, a total amount of memory used is increased to more than double at the time of learning of the hierarchical neural network.

The first embodiment or the second embodiment may also be applied to the calculation of the neural network using such a momentum method.

Figure 13:
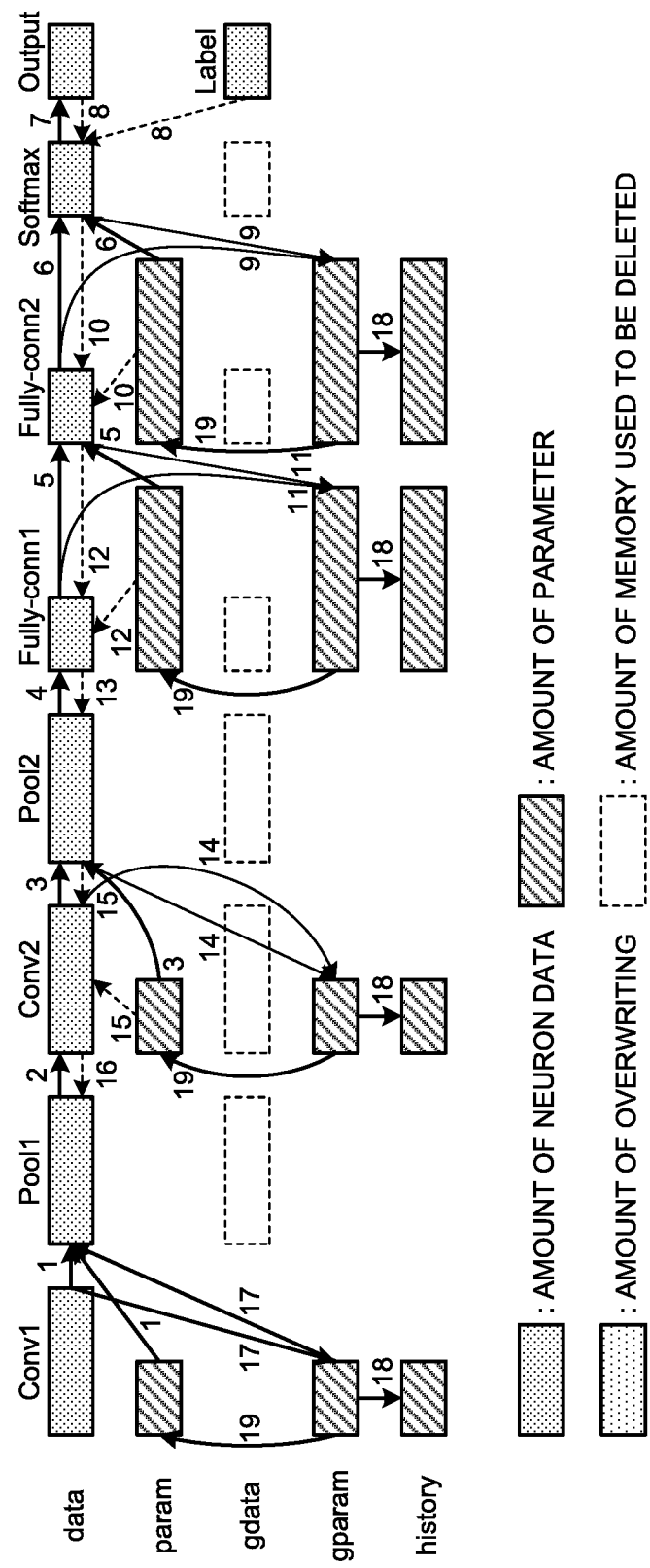
FIG. 13 is a diagram illustrating an example of the flow of calculation of a neural network performed by using a momentum method that uses the first embodiment.

First, a description will be given of an example of the flow of the calculation of the neural network by using the momentum method that uses the first embodiment. FIG. 13 is a diagram illustrating an example of the flow of calculation of the neural network performed by using the momentum method that uses the first embodiment. FIG. 13 illustrates the flow of the calculation in a case in which the process of the neural network performed by using the same momentum method as that illustrated in FIG. 11 is performed by the information processing device 10 according to the embodiment. The arrows indicate the flow of the process at the time of learning of the neural network. The number attached to the arrow indicates the order of processes.

When learning of a neural network is performed, the recognition control unit 70 performs the recognition process that identifies the image that is the learning target. For example, similar to the calculation of the conventional neural network illustrated in FIG. 11, the recognition control unit 70 performs the process of each layer in the order of the numbers "1" to "7" and outputs the processing result (Output). Then, the learning control unit 71 performs the learning process of updating the parameter from the error obtained from the identification result of the recognition process. For example, as indicated by the number "8", the recognition control unit 70 obtains the error by comparing the identification result with the correct answer. Then, as indicated by the numbers "9" to "18", the recognition control unit 70 changes the parameter while sequentially calculating the gradient of the error of each layer.

For example, the learning control unit 71 overwrites and holds the gradient of the error of the output result calculated based on the output result of the identification layer (Softmax) held in the memory 60 in the memory area, in the memory 60, in which the output result of the identification layer (Softmax) is held. Consequently, compared with the conventional method, it is possible to reduce the memory area that stores therein the gradient of the error of the identification layer (Softmax).

Furthermore, regarding the layer in which the neuron data and the parameter are held in the memory areas, the learning control unit 71 performs control of calculating the error of the parameter and holding the calculated error of the parameter in a new memory area in the memory 60. Then, the learning control unit 71 performs control of calculating an error of the neuron data and overwriting and holding the calculated error of the neuron data in the memory area, in the memory 60, in which the neuron data obtained from the recognition process is held. In the example illustrated in FIG. 13, the first convolution layer (Conv1), the second convolution layer (Conv2), the first fully connected layer (Fully-conn1), and the second fully connected layer (Fully-conn2) hold the neuron data and the parameter in the memory area. Regarding these layers, the learning control unit 71 calculates the error of the parameter and holds the calculated error in a new memory area in the memory 60. Then, the learning control unit 71 performs control of calculating an error of the neuron data and overwriting and holding the error of the subject neuron data in the memory area, in the memory 60, in which the neuron data obtained from recognition process is held. For example, in a case of the second fully connected layer (Fully-conn2), as indicated by the number "9", the learning control unit 71 calculates the error of the parameter. The learning control unit 71 performs control of holding the calculated error of the parameter in a new memory area in the memory 60. Then, as indicated by the number "10", the learning control unit 71 calculates the error of the neuron data. The learning control unit 71 performs control of overwriting and holding the calculated error of the neuron data in the memory area, in the memory 60, in which the neuron data obtained from recognition process is held. Consequently, compared with the calculation of the conventional neural network illustrated in FIG. 11, it is possible to reduce the memory area that stores therein the error of the neuron data of the first convolution layer, the second convolution layer, the first fully connected layer, and the second fully connected layer.

Figure 14:
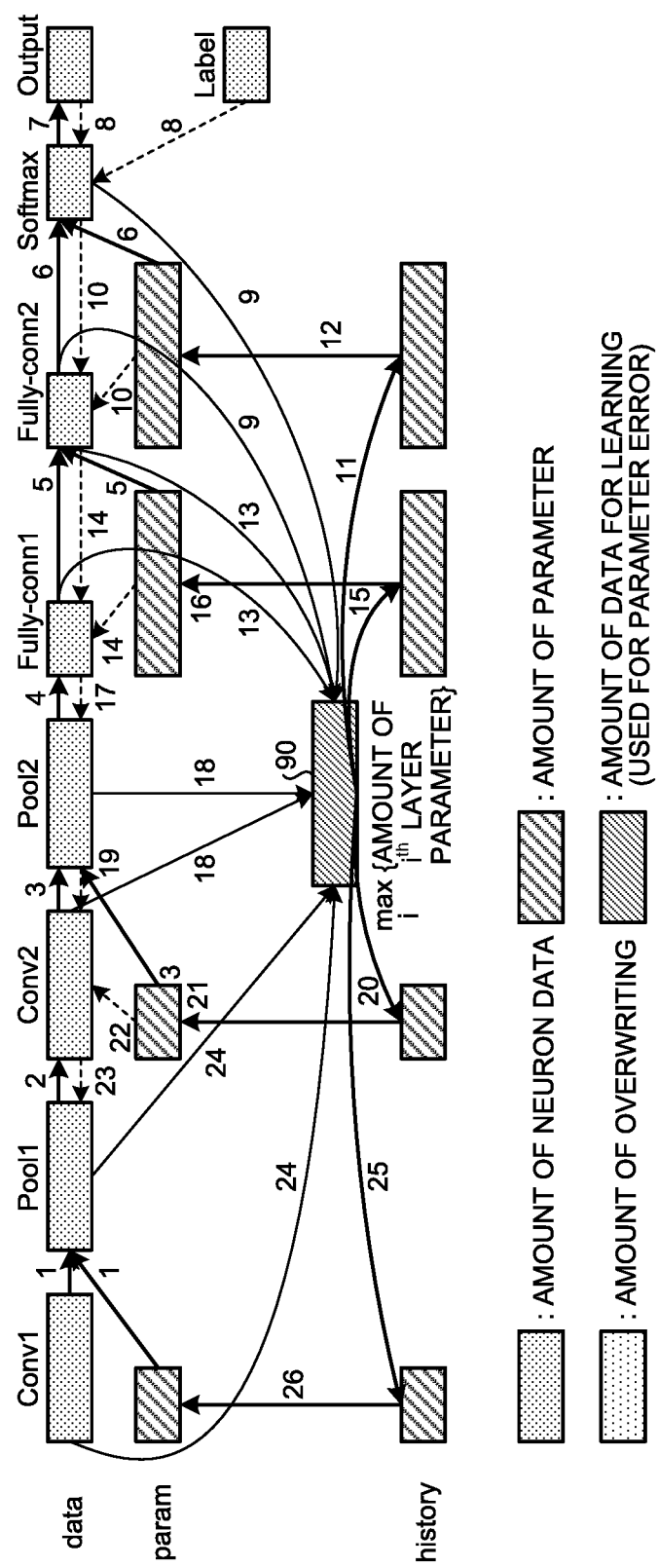
FIG. 14 is a diagram illustrating an example of the flow of calculation of a neural network performed by using a momentum method that uses the second embodiment.

In the following, a description will be given of an example of the flow of calculation of the neural network performed by using the momentum method that uses the second embodiment. FIG. 14 is a diagram illustrating an example of the flow of calculation of the neural network performed by using the momentum method that uses the second embodiment. FIG. 14 illustrates the flow of the calculation in a case in which the process of the neural network performed by using the same momentum method as that illustrated in FIG. 11 is performed by the information processing device 10 according to the embodiment. The arrows indicate the flow of the process at the time of learning of the neural network. The number attached to the arrow indicates the order of processes.

When learning of a neural network is performed, the recognition control unit 70 performs the recognition process that identifies the image that is the learning target. For example, similar to the calculation of the conventional neural network illustrated in FIG. 11, the recognition control unit 70 performs the process of each layer in the order of the numbers "1" to "7" and output the processing result (Output). Then, the learning control unit 71 performs the learning process of updating the parameter from the error obtained from the identification result of the recognition process. For example, as indicated by the number "8", the recognition control unit 70 obtains the error by comparing the identification result with the correct answer. Then, as indicated by the numbers "9" to "26", the recognition control unit 70 changes the parameter while sequentially calculating, for each layer, the gradient of the error of each of the layers.

For example, the learning control unit 71 overwrites and holds the gradient of the error obtained from the output result calculated based on the output result of the identification layer (Softmax) held in the memory 60 in the memory area in which the output result of the identification layer (Softmax) in the memory 60 is held. Consequently, when compared with the conventional method, it is possible to reduce the memory area that stores therein the gradient of the error of the identification layer (Softmax).

Furthermore, the learning control unit 71 reserves, in the memory 60, the parameter error purpose storage area 90 that is associated with the amount of memory used in the layer in which the amount of memory used is the greatest out of the amount of memory used to store the error of the parameter in each layer. Then, the learning control unit 71 performs the learning process of updating the parameter from the error obtained from the identification result of the recognition process. At this time, regarding the layer in which the neuron data and the parameter are held in the memory areas, the learning control unit 71 performs control of calculating, for each layer, the error of the parameter and overwriting and holding the error of the subject parameter in the parameter error purpose storage area 90. Then, the learning control unit 71 performs control of calculating the error of the neuron data and overwriting and holding the error of the subject neuron data in the memory area in which the neuron data obtained from the recognition process is held. Then, the learning control unit 71 performs control of updating the parameter held in the recognition process by using the error of the parameter held in the parameter error purpose storage area 90. In the example illustrated in FIG. 14, the first convolution layer (Conv1), the second convolution layer (Conv2), the first fully connected layer (Fully-conn1), and the second fully connected layer (Fully-conn2) hold the neuron data and the parameter in memory area. Regarding these layers, the learning control unit 71 calculates the error of the parameter and holds the calculated errors in a new memory area in the memory 60. Then, the learning control unit 71 performs control of calculating the error of the neuron data and overwriting and holding the error of the subject neuron data in the memory area, in the memory 60, in which the neuron data obtained from the recognition process is held. For example, as indicated by the number "9", in a case of the second fully connected layer (Fully-conn2), the learning control unit 71 calculates the error of the parameter. The learning control unit 71 holds the calculated error of the parameter in the parameter error purpose storage area 90 in the memory 60. Then, as indicated by the number "10", the learning control unit 71 calculates the error of the neuron data. The learning control unit 71 overwrites and holds the calculated error of the neuron data in the memory area, in the memory 60, in which the neuron data obtained from the recognition process is held. Then, as indicated by the numbers "11" and "12", by using the error of the parameter and the error in the previous cycle held in the parameter error purpose storage area 90, the learning control unit 71 updates the parameter held at the time of the recognition process. Consequently, because the information processing device 10 can share the storage area that stores therein the error of the parameter of each layer, it is possible to efficiently use the memory at the time of learning. Consequently, the information processing device 10 can reduce the amount of memory used at the time of learning.

In the neural network that uses the first embodiment and the second embodiment, in the process of each layer at the time of learning process, the error of the parameter may also be calculated from Equation (18) below and the value of the parameter may also be updated.

$$w = w - lr \times \Sigma(\text{bottom\_x} \times \text{top\_gx}) \quad (18)$$

Furthermore, the error of the parameter may also be calculated from Equation (19-1) below and the value of the parameter may also be updated by using Equation (19-2).

$$v = \text{momentum} \times v - lr \times \Sigma(\text{bottom\_x} \times \text{top\_gx}) \quad (19\text{-}1)$$

$$w = w - v \quad (19\text{-}2)$$

where, $\Sigma$ indicates that an update of the parameter is repeated with respect to the errors by the number of times corresponding to the number of mini batches.

An example of the effect will be described. For example, a description will be given of an example of the effect in a case in which the second embodiment is applied to the calculation of the neural network using the momentum method illustrated in FIG. 14. FIG. 15 is a diagram illustrating an example of the amount of memory used in the neural network performed by using the momentum method that uses the second embodiment. The example illustrated in FIG. 15 indicates the amount of memory used in a case in which the process of the neural network illustrated in FIG. 14 is performed by dividing the input data into units of 64 pieces (batch size M=64). As illustrated in FIG. 15, the information processing device 10 significantly reduces the amount of memory used at the time of learning. For example, in the example illustrated in FIG. 15, compared with the example illustrated in FIG. 12, a total amount of memory used can be reduced by 33.9%(=(15254448-10088224)/15254448).

Figure 16:
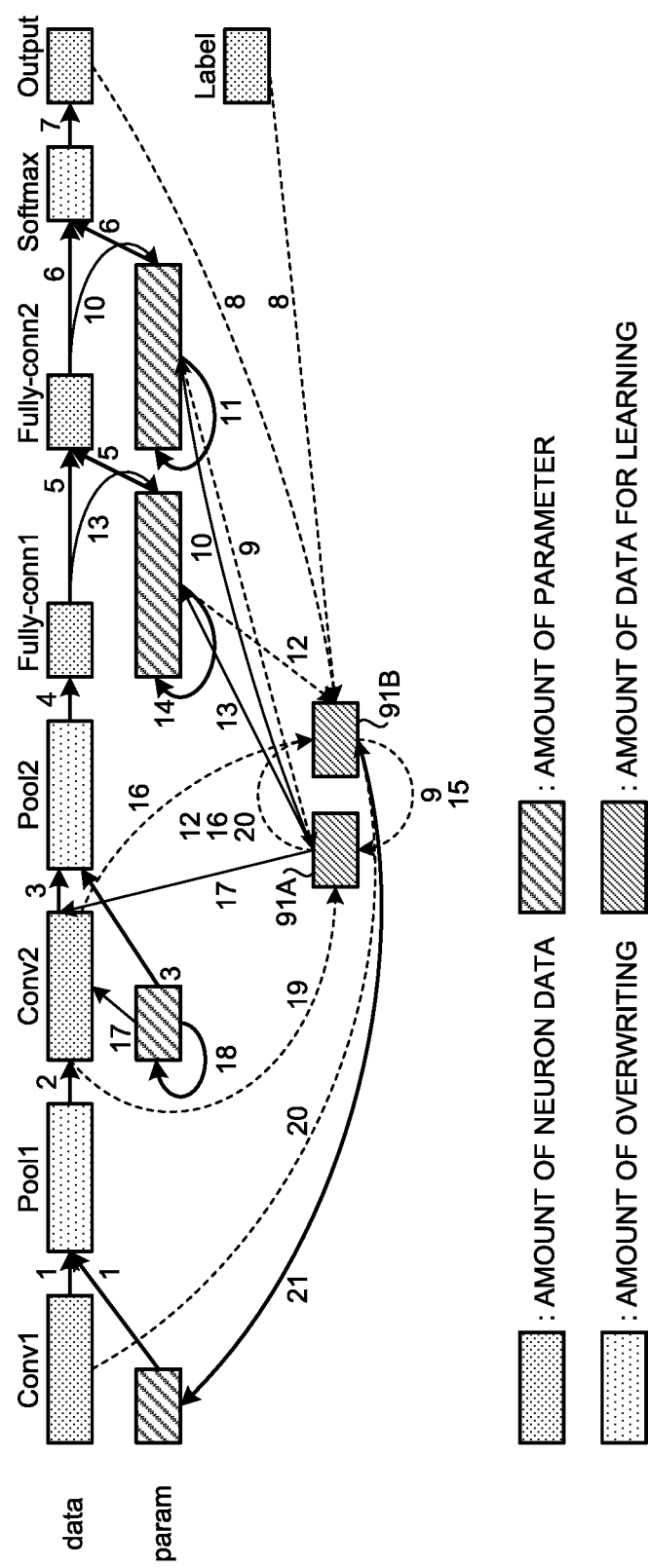
FIG. 16 is a diagram illustrating an example of the flow of calculation of a neural network.

Furthermore, in each of the embodiments, in the learning process, regarding the layer in which the neuron data and the parameter are held in the memory areas, a case in which the error of the neuron data is calculated after calculating the error of the parameter has been described. However, the embodiment is not limited to these. For example, in the learning process, regarding the layer in which the neuron data and the parameter are held in the memory areas, the learning control unit 71 may also perform the process for each layer as follows. The learning control unit 71 calculates, for each layer, the gradient of the error that uses a smaller amount of memory between the neuron data and the parameter and then holds the result in the memory area. Then, the learning control unit 71 may also perform control of calculating the gradient of the error that uses a greater amount of memory used and overwriting the result in the memory area in which the data obtained from the recognition process is held. Namely, the learning control unit 71 may also reduce the amount of the memory by firstly calculating the error having a smaller size between the neuron size and the parameter size and then overwriting the subsequent error calculation result in the memory area that is used at the time of recognition. In the learning process described above, the learning control unit 71 may also use the error memory area having a smaller size between the neuron size and the parameter size of each layer and reserving the maximum area out of these error memory areas as the memory area that is to be used for the learning. A description will be given of an example of the flow of calculating the neural network described above. FIG. 16 is a diagram illustrating an example of the flow of calculation of the neural network. FIG. 16 indicates the flow of the calculation in a case in which the process of the neural network is performed by the information processing device 10 according to the embodiment. It is assumed that the neural network has the same hierarchical structure as that illustrated in FIGS. 3 and 7. The "data" indicates the data size of the neuron data in each layer. The "param" indicates the data size of the parameter of each layer. The arrows indicate the flow of the process at the time of learning of the neural network. The number attached to the arrow indicates the order of processes. When learning of a neural network is performed, the recognition control unit 70 performs the recognition process that identifies the image that is the learning target. For example, similar to the calculation of the conventional neural network according to the first embodiment illustrated in FIG. 7, the recognition control unit 70 performs the process of each layer in the order of the numbers "1" to "7" and outputs the processing result (Output). When learning of a neural network is performed, the learning control unit 71 reserves storage areas 91A and 91B used for the learning in the memory 60. For example, the learning control unit 71 reserves the storage areas 91A and 91B associated with the amount of memory used in the layer in which the amount of memory used is the maximum between the neuron data and the parameter for each layer. Then, the learning control unit 71 performs the learning process of updating the parameter from the error obtained from the identification result from the recognition process. For example, the recognition control unit 70 may also sequentially calculate the gradient of the error of the parameter for each layer in the order of the numbers "8" to "21", calculate the gradient of the error of the neuron data, and then update the parameter.

Furthermore, in each of the embodiments, the case of identifying the identification target captured on the image by using the neural network has been described. However, the embodiment is not limited to these. For example, any identification target may also be used as long as identification target is used by a neural network, such as a voice.

Furthermore, in each of the embodiments, the case of using a convolutional neural network (CNN) as a neural network has been described. However, the embodiment is not limited to these. For example, the neural network may also be a neural network that can learn and recognize time series, such as a Recurrent Neural Network (RNN), or the like. The RNN is expansion of the CNN and performs, similarly to the CNN, error backpropagation; therefore, the same process as that performed in the embodiment can be used.

Furthermore, in each of the embodiments, the case of performing the recognition process and the learning process by using the single information processing device 10 has been described. However, the embodiment is not limited to these. For example, the configuration may also be used in an information processing system in which the recognition process and the learning process are performed by a plurality of the information processing devices 10. For example, in a case of processing the input data by using the mini-batch method, the information processing system divides the input data into M pieces, performs the recognition process and the learning process by using the other information processing device 10, collects each of the errors of the parameters, and updates the parameters.

Furthermore, in each of the embodiments, the case of providing the amount-of-memory calculation unit 51 in the operation unit 31 on the motherboard 21 has been described. However, the embodiment is not limited to these. For example, the amount-of-memory calculation unit 51 may also be provided in the operation unit 61 on the accelerator board 22. Then, the amount-of-memory calculation unit 51 in the operation unit 61 on the accelerator board 22 may also calculate, in each layer in the neural network, the amount of memory used that is used to store the neuron data and the parameter.

Furthermore, in each of the embodiments, the case of calculating the amount of memory used that is used in the identification process and the learning process before starting of the identification process has been described. However, the embodiment is not limited to these. For example, the amount of memory used that is used to perform the identification process may also be calculated before the start of the identification process and then the amount of memory used that is used to perform the learning process may also be calculated after the end of the identification process and before the start of the learning process.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, each of the processing units of the overall control unit 50, the amount-of-memory calculation unit 51, the recognition control unit 70, and the learning control unit 71 may also appropriately be integrated. Furthermore, the process performed by each of the processing units may also appropriately be separated into processes performed by a plurality of processing units. Furthermore, all or any part of each of the processing functions performed by the processing units can be implemented by a CPU and by programs analyzed and executed by the CPU or implemented as hardware by wired logic.

Information Processing Program

Figure 17:
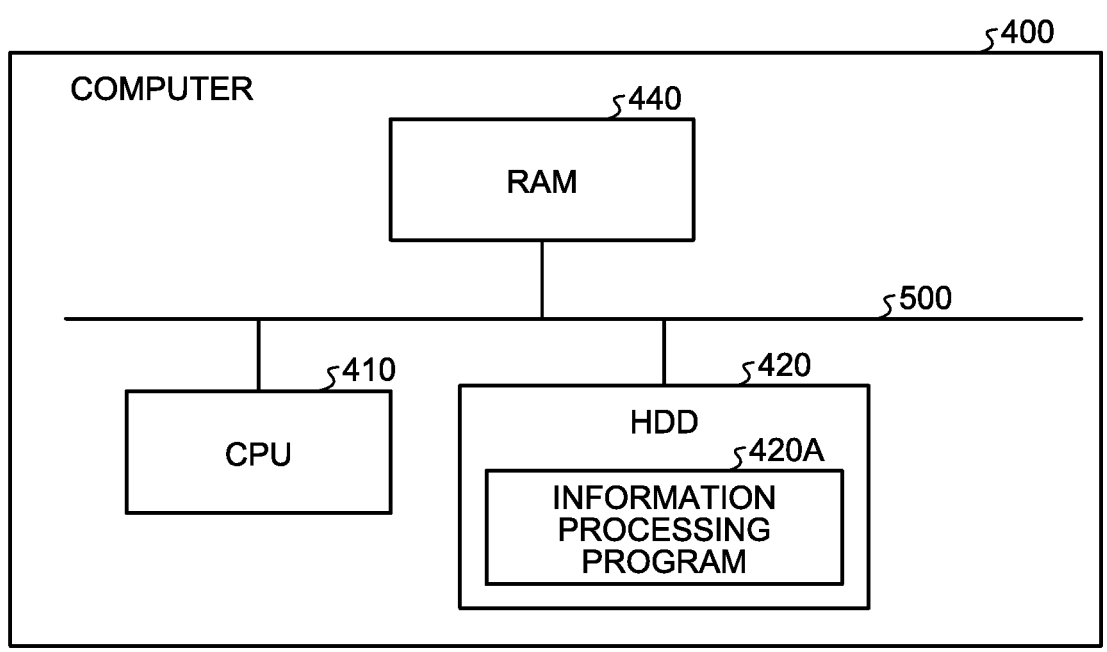
FIG. 17 is a diagram illustrating an example of the configuration of a computer that executes an information processing program.

Furthermore, various kinds of processes described in the above embodiments can be implemented by executing programs prepared in advance in a computer system, such as a personal computer, a workstation, or the like. Accordingly, in the following, a description will be given of an example of a computer system that executes an information processing program. FIG. 17 is a diagram illustrating an example of the configuration of a computer that executes an information processing program.

As illustrated in FIG. 17, a computer 400 includes a central processing unit (CPU) 410, a hard disk drive (HDD) 420, and a random access memory (RAM) 440. Each of the units 400 to 440 is connected by a bus 500.

The HDD 420 stores therein, in advance, an information processing program 420A that exhibits the same function as that of each of the overall control unit 50, the amount-of-memory calculation unit 51, the recognition control unit 70, and the learning control unit 71. Furthermore, the information processing program 420A may also appropriately be separated.

Furthermore, the HDD 420 stores therein various kinds of information. For example, similarly to the storage unit 20, the HDD 420 stores therein an OS, various kinds of programs, and various kinds of information.

Then, the CPU 410 reads the information processing program 420A from the HDD 420 and executes the information processing program 420A, whereby the CPU 410 executes the same operation as that executed by each of the processing units according to the embodiments. Namely, the information processing program 420A executes the same operation as that executed by the overall control unit 50, the amount-of-memory calculation unit 51, the recognition control unit 70, and the learning control unit 71.

Furthermore, the information processing program 420A described above does not need to be stored in the HDD 420 from the beginning. Furthermore, for example, the information processing program 420A may also be stored in a "portable physical medium", such as a flexible disk (FD), a compact disk read only memory (CD-ROM), a digital versatile disk (DVD disk), a magneto-optic disk, an IC card, or the like, that is to be inserted into a computer 400. Then, the computer 400 may also read and execute the program from the portable physical medium.

Furthermore, the programs may also be stored in "other computers (servers)" or the like connected to the computer 400 via a public circuit, the Internet, a LAN, a WAN, or the like. Then, the computer 400 may also read and execute the program from the other computers.

According to an aspect of an embodiment of the present invention, an advantage is provided in that it is possible to effectively use a memory at the time of learning.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising: a processor that executes a process, the process comprising:
controlling a recognition process that performs, with respect to input neuron data, a hierarchical neural network operation including a weighting operation using a parameter and that holds a neuron data and a parameter of each layer of the neural network in each of memory areas;
calculating an amount of memory used to store an error of the parameter of each layer of the neural network; and
performing, in a learning process of learning the parameter of each layer of the neural network from an error that is obtained from a recognition result, regarding a layer in which the neuron data and a parameter are held in the memory areas, control of
reserving a memory area that is associated with an amount of memory used in a layer in which an amount of memory used is the greatest out of the amount of memory used to store the error of the parameter calculated in each layer,
calculating, in the learning process, for each layer, the error of the parameter and then overwriting and holding the error of the parameter in the reserved memory area,
calculating, in the learning process, for each layer, an error of the neuron data and then overwriting and holding the error of the neuron data in a memory area in which the neuron data held at the recognition process is held, and
updating, by using the error of the parameter held in the memory area reserved at the reserving, the parameter held at the time of the recognition process.

2. The information processing device according to claim 1, wherein, the performing performs, regarding the layer in which the neuron data and the parameter are held in the memory areas, control of, after the calculating the error of the parameter calculated in the learning process and holding the calculated error in a new memory area, the calculating the error of the neuron data calculated in the learning process and then overwriting and holding the error of the neuron data in the memory area in which the neuron data held at the recognition process is held.

3. The information processing device according to claim 1, wherein, the performing calculates, regarding the layer in which the neuron data and the parameter are held at the recognition process in the memory areas, the error of the parameter from the neuron data of the layer held at the recognition process and the neuron data of a layer previous to the layer and calculates the error of the neuron data from a parameter of the layer and the neuron data of the layer previous to the layer.

4. An information processing method comprising:
controlling a recognition process that performs, with respect to input neuron data, a hierarchical neural network operation including a weighting operation using a parameter and that holds the a neuron data and the a parameter of each layer of the neural network in each of memory areas;
calculating an amount of memory used to store an error of the parameter of each layer of the neural network; and
performing, in a learning process of learning the parameter of each layer of the neural network from an error that is obtained from a recognition result, regarding the a layer in which the neuron data and a parameter are held in the memory areas, control of
reserving a memory area that is associated with an amount of memory used in the a layer in which an amount of memory used is the greatest out of the amount of memory used to store the error of the parameter calculated in each layer,
calculating, in the learning process, for each layer, the error of the parameter and then overwriting and holding the error of the parameter in the reserved memory area,
calculating, in the learning process, for each layer, an error of the neuron data and then overwriting and holding the error of the neuron data in a memory area in which the neuron data held at the recognition process is held, and
updating, by using the error of the parameter held in the memory area reserved at the reserving, the parameter held at the time of the recognition process.

5. A non-transitory computer-readable recording medium having stored therein a program that causes a computer to execute a process comprising:

controlling a recognition process that performs, with respect to input neuron data, a hierarchical neural network operation including a weighting operation using a parameter and that holds a neuron data and a parameter of each layer of the neural network in each of memory areas;

calculating an amount of memory used to store an error of the parameter of each layer of the neural network; and performing, in a learning process of learning the parameter of each layer of the neural network from an error that is obtained from a recognition result, regarding a layer in which the neuron data and a parameter are held in the memory areas, control of reserving a memory area that is associated with an amount of memory used in a layer in which an amount of memory used is the greatest out of the amount of memory used to store the error of the parameter calculated in each layer, calculating, in the learning process, for each layer, the error of the parameter and then overwriting and holding the error of the parameter in the reserved memory area, calculating, in the learning process, for each layer, an error of the neuron data and then overwriting and holding the error of the neuron data in the a memory area in which the neuron data held at the recognition process is held, and updating, by using the error of the parameter held in the memory area reserved at the reserving, the parameter held at the time of the recognition process.

* * * * *